United States Patent
Bato et al.

(10) Patent No.: US 8,189,180 B2
(45) Date of Patent: May 29, 2012

(54) OPTICAL FIBER TRANSMISSION LINE MEASUREMENT APPARATUS AND SYSTEM

(75) Inventors: Koji Bato, Kawasaki (JP); Taro Asao, Kawasaki (JP); Yoshinori Tochiki, Kawasaki (JP); Haruka Miyazaki, Kawasaki (JP); Akira Yamamoto, Fukuoka (JP); Katsumi Sugawa, Fukuoka (JP); Tatsuo Nagayoshi, Fukuoka (JP); Kousuke Nakamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 12/576,334

(22) Filed: Oct. 9, 2009

(65) Prior Publication Data

US 2010/0097601 A1    Apr. 22, 2010

(30) Foreign Application Priority Data

Oct. 22, 2008  (JP) .................................. 2008-271601

(51) Int. Cl.
   *G01N 21/00* (2006.01)
(52) U.S. Cl. ...................................... 356/73.1
(58) Field of Classification Search .................. 356/73.1
   See application file for complete search history.

(56) References Cited

U.S. PATENT DOCUMENTS 5,324,933 A * 6/1994 Berkcan .................... 250/227.23
6,075,907 A * 6/2000 Krol ................................ 385/12

FOREIGN PATENT DOCUMENTS

JP    5-22323    1/1993

* cited by examiner

*Primary Examiner* — Tarifur Chowdhury
*Assistant Examiner* — Tara S Pajoohi
(74) *Attorney, Agent, or Firm* — Staas & Halsey LLP

(57) ABSTRACT

A measurement apparatus for measuring an optical fiber transmission line used to connect to an opposite apparatus, the measurement apparatus includes a transmission part for generating a measurement packet used for measuring a length of a first and second optical fiber transmission line, and transmitting the measurement packet to the opposite apparatus through the first optical fiber transmission line, a reception part for detecting the measurement packet returned from the opposite apparatus that perform a loopback processing of the measurement packet through the second optical fiber transmission line, a calculation part for calculating a packet transmission time which is a processing time required from the generation of the measurement packet to the detection of the measurement packet, and a measurement part for performing a measurement control of the length of the first and second optical fiber transmission line based on the packet transmission time calculated by the calculation part.

10 Claims, 21 Drawing Sheets

OPTICAL FIBER TRANSMISSION LINE MEASUREMENT APPARATUS AND SYSTEM

CROSS-REFERENCE TO RELATED APPLICATION

This application is based upon and claims the benefit of priority of the prior Japanese Patent Application No. 2008-271601, filed on Oct. 22, 2008, the entire contents of which are incorporated herein by reference.

FIELD

The embodiments discussed herein are related to a measurement apparatus for measuring an optical fiber transmission line used to connect to an opposite apparatus, and a measurement system.

BACKGROUND

In recent years, network connection via optical fiber in general households, mobile phones, and the like has become widely used, so that an increase in the transmission capacity of an optical network is required. In a backbone network, the transmission capacity of a carrier wave is increasing to 40 Gbps/100 Gbps.

On the other hand, since a propagation time of light in an optical fiber varies depending on a wavelength of light, as a transmission distance gets longer, a wavelength dispersion in which a light pulse waveform becomes dull occurs. If pulse broadening due to the wavelength dispersion occurs in a WDM (Wavelength Division Multiplex) system and the like which realize an optical transmission with a large capacity and long distance, a reception level significantly deteriorates to exert a harmful influence on the system. Therefore, in order to suppress dispersion generated in an optical fiber transmission line, a dispersion compensation for making the wavelength dispersion equal zero (cancelling the wavelength dispersion) is performed.

As attributes related to the dispersion compensation, there are fiber length between stations, amount of dispersion, dispersion slope, and the like. When building an optical communication network, values of these attributes need to satisfy conditions corresponding to the network design for performing the dispersion compensation.

When laying or maintaining optical transmission apparatus in a field, multiple attribute values such as a length of fiber laid between stations, an amount of dispersion and a dispersion slope need to be arbitrarily measured and monitored. As a conventional measurement technique for an optical fiber transmission line, it is disclosed in Japanese Laid-open Patent Publication No. 05-22323 that a technique in which a signal is transmitted from a monitoring device, a delay time of the looped back signal is measured, and a length of the optical fiber is measured is proposed.

When measuring a length of optical fiber and an amount of dispersion, an Optical Time Domain Reflectometer (OTDR) is generally used.

FIG. 20 is a diagram illustrating a measurement system using the OTDR. The OTDR 100 is arranged at an end of an optical fiber F to be measured. The OTDR 100 transmits a test light pulse toward the optical fiber F, and measures a time, an intensity level, and the like of the returned light from the reflection end.

Since a measurement principle of OTDR is basically to use a reflection, in an optical fiber measurement using a conventional OTDR, when the optical fiber is laid over a long distance (for example, when exceeding 100 km) or a light loss through the optical fiber is large, there is a problem that a correct measurement is difficult because an intensity level of the reflected light from a far-away end is low.

In addition, in a measurement using the OTDR, the system needs to be stopped.

FIG. 21 is a diagram illustrating that a halt of system operation is required. Optical transmission apparatuses 101 to 104 are connected by optical fibers in a ring shape.

In such a system, when trying to measure the length of optical fiber F1 connecting the optical transmission apparatus 103 and the optical transmission apparatus 104 using the OTDR, for example, it is required that the OTDR 100 is mounted on the optical transmission apparatus 104 and a reflection end is generated by releasing the optical fiber F1 connected to the optical transmission apparatus 103 (by disconnecting an optical connector). In this way, when using an optical measurement apparatus such as OTDR, the system operation must be stopped, so that there is a problem that maintenance is inefficient.

Furthermore, since conventional optical fiber transmission line measurements are not automated, connection and setting of optical measurement apparatus such as OTDR are performed manually one by one at a point to be measured, so that there is a problem that the conventional measurements lack not only maintainability but also convenience.

SUMMARY

According to an aspect of the embodiment, a measurement apparatus for measuring an optical fiber transmission line used to connect to an opposite apparatus, the measurement apparatus includes a transmission part for generating a measurement packet used for measuring a length of a first and second optical fiber transmission line, and transmitting the measurement packet to the opposite apparatus through the first optical fiber transmission line, a reception part for detecting the measurement packet returned from the opposite apparatus that perform a loopback processing of the measurement packet through the second optical fiber transmission line, a calculation part for calculating a packet transmission time which is a processing time required from the generation of the measurement packet to the detection of the measurement packet, and a measurement part for performing a measurement control of the length of the first and second optical fiber transmission line based on the packet transmission time calculated by the calculation part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
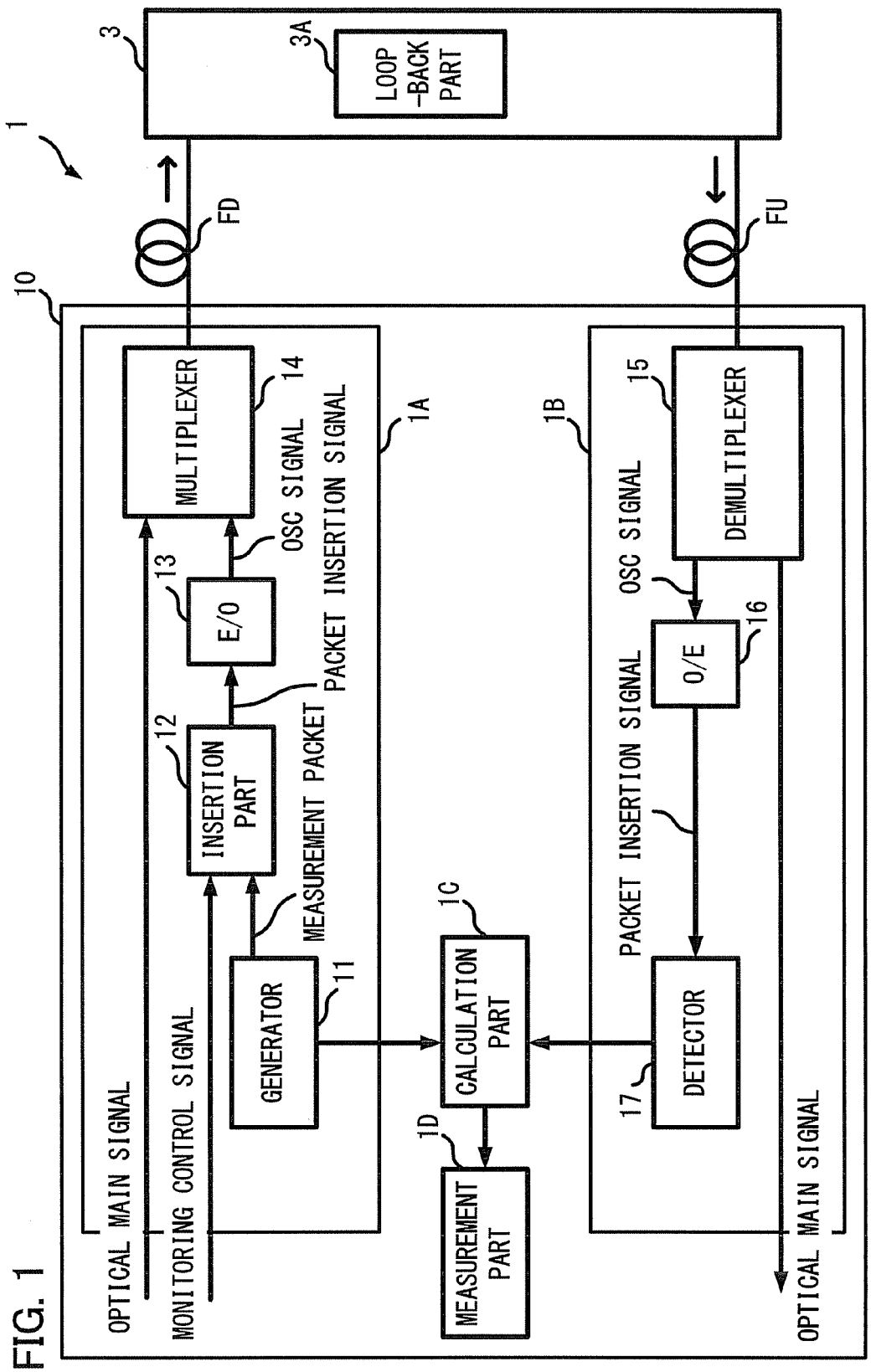
FIG. 1 is a diagram illustrating a configuration example of an optical fiber transmission line measurement system.

Hereinafter, embodiments will be described with reference to the drawings.
First Embodiment FIG. 1 is a diagram illustrating a configuration example of an optical fiber transmission line measurement system. The optical fiber transmission line measurement system 1 includes a measurement apparatus 10 and an opposite apparatus 3, which are connected (in FIG. 1, a flow from left to right is assumed to be downward, and a flow from right to left is assumed to be upward) by optical fiber transmission lines (a downward optical fiber FD and an upward optical fiber FU).

The measurement apparatus 10 includes a transmission part 1A, a reception part 1B, a calculation part 1C, and a measurement part 1D. The transmission part 1A includes a measurement packet generation part (generator) 11, an insertion part 12, an electric/optical conversion part (E/O) 13, and a multiplexer 14. The reception part 1B includes a demultiplexer 15, an optical/electric conversion part (O/E) 16, and a measurement packet detection part (detector) 17.

The generator 11 generates a measurement packet. The measurement packet is a packet used for measuring a length of optical fiber (FD and FU). The insertion part 12 inserts a measurement packet into a monitoring control signal to generate a packet insertion signal. The E/O 13 converts the packet insertion signal into an optical signal to generate an optical monitoring control signal (corresponds to an OSC (Optical Supervisor Channel) signal). The multiplexer 14 multiplexes the optical monitoring control signal (OSC signal) on an optical main signal to generate an optical multiplex signal, and transmits the optical multiplex signal to the opposite apparatus 3 via the downward optical fiber FD.

The demultiplexer 15 receives the optical multiplex signal transmitted from the opposite apparatus 3 via the upward optical fiber FU, and demultiplexes the optical multiplex signal into the optical main signal and the optical monitoring control signal. The O/E 16 converts the optical monitoring control signal (OSC signal) into electricity to reproduce the packet insertion signal. The detector 17 detects the measurement packet returned from the opposite apparatus 3 from the reproduced packet insertion signal.

The calculation part 1C calculates a packet transmission time which is a processing time required from the generation of the measurement packet to the detection of the measurement packet. The measurement part 1D performs a measurement control of the optical fiber transmission line such as the length and the amount of dispersion of the optical fiber transmission line on the basis of the packet transmission time.

The opposite apparatus 3 includes a loopback part 3A. The loopback part 3A receives the measurement packet transferred through the downward optical fiber FD, and returns the measurement packet as an output to the measurement apparatus 10.

Here, when the optical fiber transmission line measurement system 1 is applied to the WDM system, the optical monitoring control signal is actually corresponds to an OSC (Optical Supervisor Channel) signal. In the communication signal used over the WDM system, in addition to the optical main signal, there is an optical signal for monitoring and controlling around 1 MHz to 150 MHz called OSC. The OSC signal is used for transmitting an operation status, error information, and the like in an apparatus to another station.

In the optical fiber transmission line measurement system 1, the measurement packet is superimposed onto the OSC signal and transmitted to the opposite apparatus, and the packet transmission time is calculated from the returned measurement packet, so that the optical fiber transmission line measurement is realized without affecting customer services even when the services are in operation.

In the optical fiber transmission line measurement system 1 in FIG. 1, for ease of understanding, the functions of the measurement apparatus and the functions of the opposite apparatus are illustrated separately. However, each apparatus has the functions of the other. In other words, the measurement apparatus 10 has the functions of the opposite apparatus 3, and the opposite apparatus 3 has the functions of the measurement apparatus 10. This is true for all the apparatus configurations described below.

Next, the WDM network to which the optical fiber transmission line measurement system 1 is applied will be described in detail.

Figure 2:
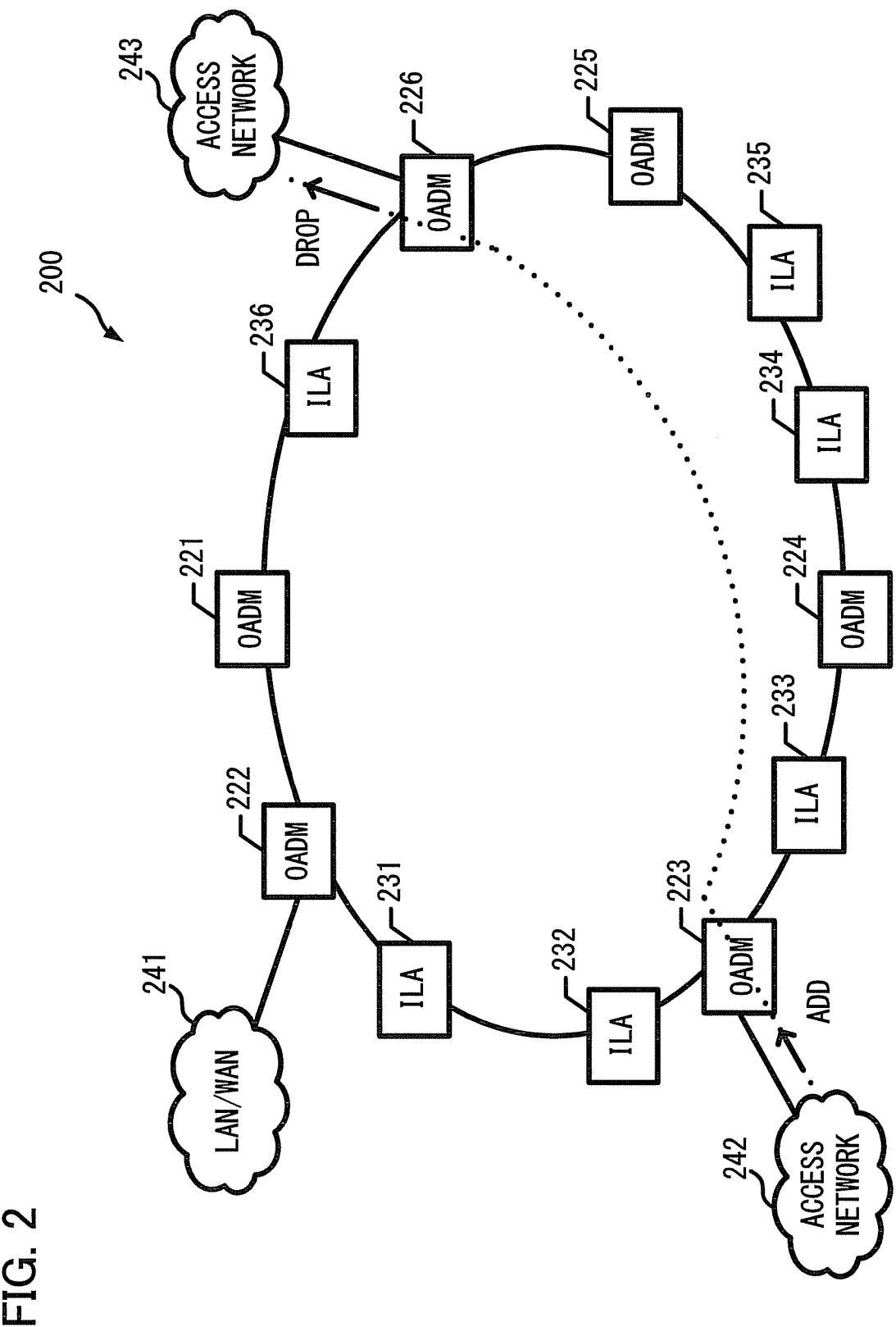
FIG. 2 is a diagram illustrating the WDM network.

FIG. 2 is a diagram illustrating the WDM network. The WDM network 200 is a ring network performing the communication over the WDM network, and the terminal stations (OADM) 221 to 226 including an Optical Add Drop Multiplexer which is an optical Add/Drop function are connected by an optical fiber in a ring shape.

Relay stations (ILA) 231 to 236 including an In-Line Amplifier are arranged between the terminal stations 231 to 236. The relay stations (ILA) 231 and 232 are arranged between the terminal stations (OADM) 222 and 223, the relay station (ILA) 233 is arranged between the terminal stations (OADM) 223 and 224, the relay stations (ILA) 234 and 235 are arranged between the terminal stations (OADM) 224 and 225, and the relay station (ILA) 236 is arranged between the terminal stations (OADM) 226 and 221. Furthermore, the LAN/WAN 241 is connected to the terminal station (OADM) 222, the access network 242 is connected to the terminal station (OADM) 223, and the access network 243 is connected to the terminal station (OADM) 226.

The Add/Drop of the transmission signal illustrated by the thick arrow in FIG. 2 will be described. A signal is transmitted from the access network 242 to the terminal station (OADM) 223, and the relay station (ILA) 232 amplifies a signal flowing counter-clockwise along the ring and outputs the signal.

The terminal station (OADM) 223 adds the signal from the access network 242 to the output signal from the relay station (ILA) 232 and multiplexes the signals (multiplexes wavelengths). The multiplexed signal sequentially passes through the relay station (ILA) 233, the terminal station (OADM) 224, the relay stations (ILA) 234, 235, and the terminal station (OADM) 225, and then arrives at the terminal station (OADM) 226. In the terminal station (OADM) 226, the received multiplexed signal is demultiplexed (wavelength-demultiplexed) into a signal that is to be transmitted in the ring and a signal that is to be dropped to the access network 243, and a predetermined signal is dropped to the access network 243.

Next, the internal structure of the OADM (terminal station) will be described.

Figure 3:
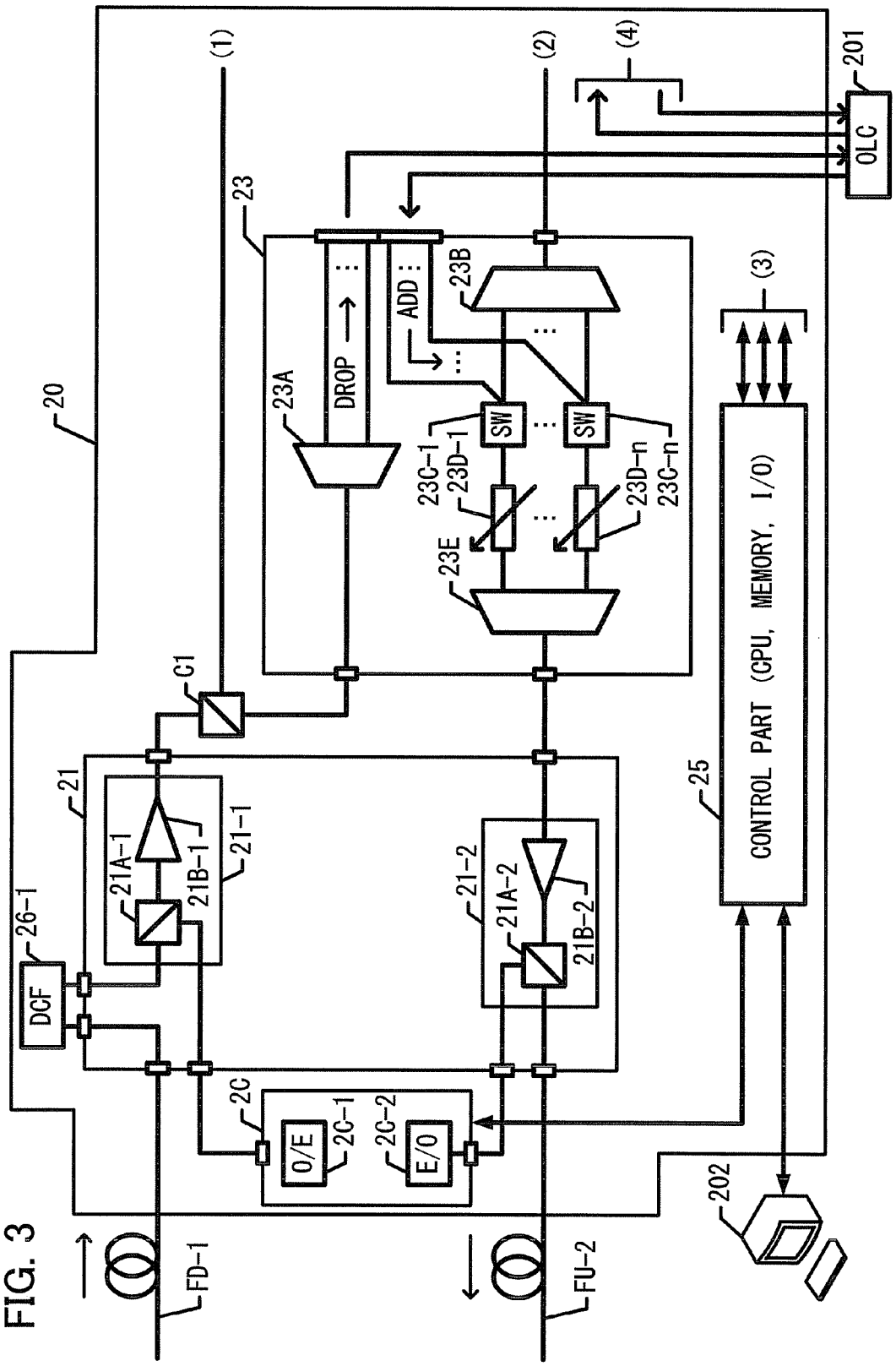
FIG. 3 is a diagram illustrating an internal structure of OADM.
Figure 4:
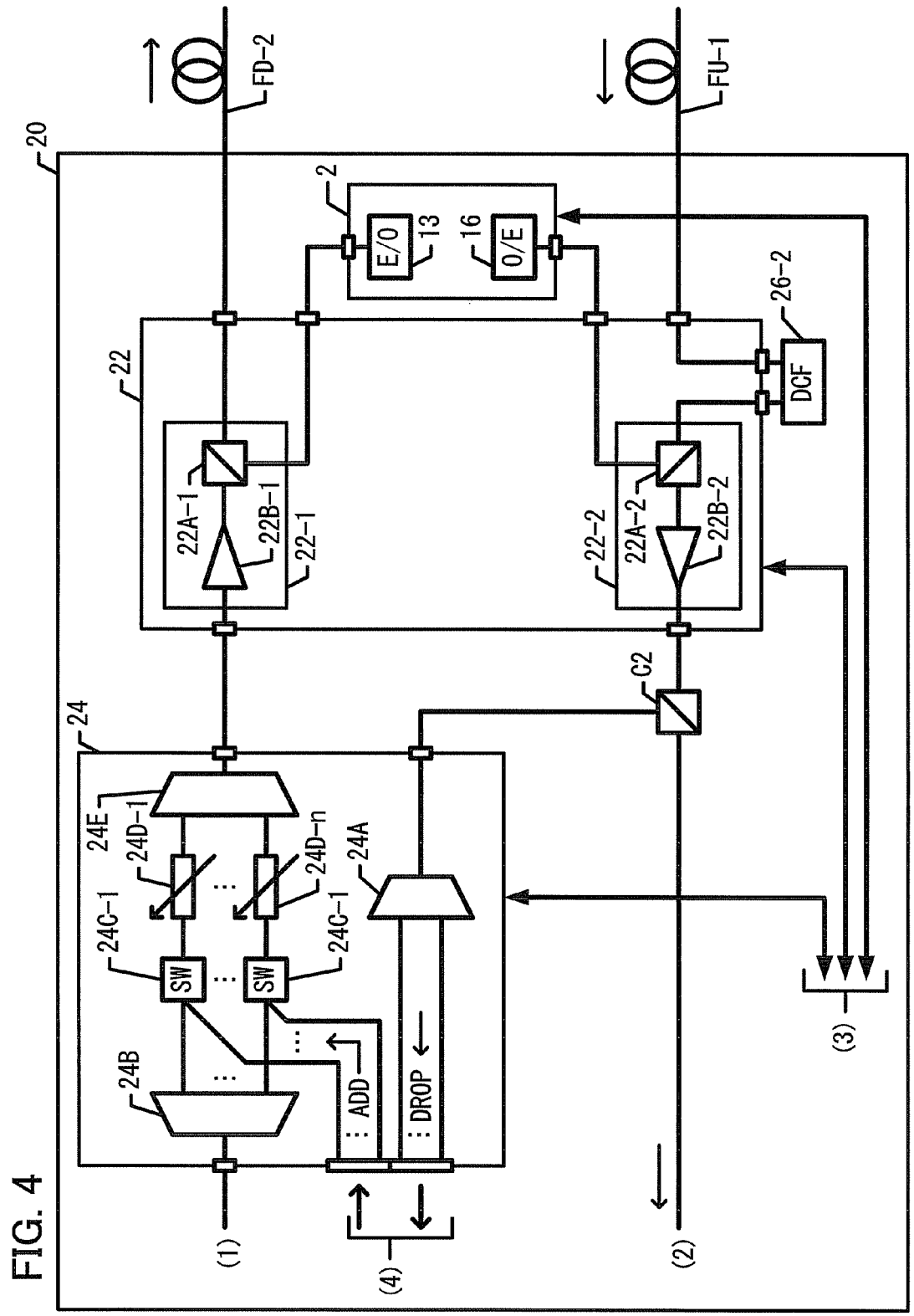
FIG. 4 is a diagram illustrating an internal structure of OADM.

FIG. 3 and FIG. 4 are diagrams illustrating the internal structure of the OADM. In FIG. 3, the OADM 20 includes an amplifier part 21, an OADM part 23, a control part 25, a DCF (Dispersion Compensation Fiber) 26-1, an OSC part 2c, and a coupler C1. In FIG. 4, the OADM 20 includes an amplifier part 22, an OADM part 24, a DCF (Dispersion Compensation Fibers) 26-2, an OSC part 2, and a coupler C2.

An OLC (Optical Line Card) 201 accommodating a tributary transmission line, which transmits an optical signal that is to be added to the wavelength-multiplexed signal applied over the WDM ring network formed to the ring and receives an optical signal dropped from the ring network, is connected to the OADM parts 23 and 24. In addition, a maintenance terminal 202 can be connected to the control part 25.

The amplifier part 21 includes a pre-amp module 21-1 containing an OSC coupler 21A-1 and a pre-amp 21B-1, and a post-amp module 21-2 containing an OSC coupler 21A-2 and a post-amp 21B-2.

The amplifier part 22 includes a post-amp module 22-1 containing an OSC coupler 22A-1 and a post-amp 22B-1, and a pre-amp module 22-2 containing an OSC coupler 22A-2 and a pre-amp 22B-2.

The OADM part 23 includes Demultiplexers (Demuxes) 23A and 23B, optical switches 23C-1 to 23C-n, VOAs (Variable Optical Attenuators) 23D-1 to 23D-n, and a Multiplexer (Mux) 23E.

The OADM part 24 includes Demuxes 24A and 24B, optical switches 24C-1 to 24C-n, VOAs 24D-1 to 24D-n, and a Mux 24E.

The OSC part 2C includes an O/E 2C-1 and an E/O 2C-2, and the OSC part 2 includes an E/O 13 and an O/E 16.

The control part 25 includes a CPU, a memory (database), an Input/Output (I/O) interface, and the like, and functions as the measurement part 1D illustrated in FIG. 1. The control part 25 also performs overall control of each configuration block of the OADM 20.

For example, the control part 25 monitors the OSC signal received by the OSC parts 2C and 2 (monitors an electric signal which is O/E-converted from the OSC signal), or transmits the status of the local station to the OSC parts 2C and 2 and instructs the OSC parts 2C and 2 to generate the OSC signal.

The control part 25 also performs an amp setting control such as an ALC (Auto Level Control) and an AGC (Auto Gain Control) for each amplifier in the amplifier parts 21 and 22. Furthermore, the control part 25 instructs the optical switch in the OADM parts 23 and 24 to switch between a Thru-side optical signal and an Add-side optical signal, and instructs the VOA to adjust a level.

The measurement result of the optical fiber transmission line is displayed on the maintenance terminal 202. The measurement instruction of the optical fiber transmission line is set in the control part 25 (measurement part 1D) via a user interface of the maintenance terminal 202.

The status (operation status, error status, and the like) of the OADM 20 are displayed on the maintenance terminal 202, and predetermined operation information and the like are set in the control part 25 via the user interface of the maintenance terminal 202.

The operation of the OADM 20 in the downward direction will be described. For ease of description, a wavelength-multiplexed optical main signal is called a WDM main signal, and a signal in which the OSC signal is multiplexed to the WDM main signal is called a WDM signal.

The WDM signal transferred through the downward optical fiber FD-1 is inputted into the DCF 26-1 and dispersion-compensated. The OSC coupler 21A-1 branches the WDM signal which has been dispersion-compensated into the WDM main signal and the OSC signal.

The OSC signal is inputted into the OSC part 2C, converted into an electric signal by the O/E 2C-1, and monitored by the control part 25. The WDM main signal is inputted into the pre-amp 21B-1, and the pre-amp 21B-1 amplifies the WDM main signal.

The coupler C1 branches the WDM main signal which has been amplified into two WDM main signals. One WDM main signal is transferred to the OADM part 23 and the other WDM main signal is transferred to the OADM part 24. The Demux 23A in the OADM part 23 demultiplexes the WDM main signal into signals of respective wavelengths, and drops an optical signal having a single wavelength into the OLC 201.

The Demux 24B in the OADM part 24 demultiplexes the WDM main signal into signals of respective wavelengths. The optical switches 24C-1 to 24C-n are provided for the respective demultiplexed wavelengths, and switch (perform switching) between the optical signal (Thru-side) having a single wavelength outputted from the Demux 24B and the optical signal (Add-side) transmitted from the OLC 201 in order to output either of the optical signals.

The VOAs 24D-1 to 24D-n are provided for the respective demultiplexed wavelengths, and perform a level control for the respective wavelengths outputted from the optical switches 24C-1 to 24C-n. For example, the VOAs 24D-1 to 24D-n adjust the optical signals of all the wavelengths to have the same level in order to output the optical signals. The Mux 24E multiplexes the optical signals of n wavelengths which have been level-adjusted to generate a new WDM main signal.

The post-amp 22B-1 amplifies the WDM main signal outputted from the Mux 24E. The OSC part 2 converts operation monitoring information and the like concerning the local station transmitted from the control part 25 into light by the E/O 13 to generate the OSC signal.

The OSC coupler 22A-1 multiplexes the WDM main signal amplified by the post-amp 22B-1 and the OSC signal transmitted from the OSC part 2 to generate the WDM signal, and transmits the WDM signal to the ring network via the downward optical fiber FD-2.

The operation of the OADM 20 in the upward direction will be described. It is seen that only the signal direction is opposite, and the operation is the same as in the downward direction.

The WDM signal transferred through the upward optical fiber FU-1 is inputted into the DCF 26-2 and dispersion-compensated. The OSC coupler 22A-2 branches the WDM signal which has been dispersion-compensated into the WDM main signal and the OSC signal.

The OSC signal is inputted into the OSC part 2, converted into an electric signal by the O/E 16, and monitored by the control part 25.

The WDM main signal is inputted into the pre-amp 22B-2, and the pre-amp 22B-2 amplifies the WDM main signal.

The coupler C2 branches the WDM main signal which has been amplified into two WDM main signals. One WDM main signal is transferred to the OADM part 24 and the other WDM main signal is transferred to the OADM part 23. The Demux 24A in the OADM part 24 demultiplexes the WDM main signal into signals of respective wavelengths, and drops an optical signal having a single wavelength into the OLC 201.

The Demux 23B in the OADM part 23 demultiplexes the WDM main signal into signals of respective wavelengths. The optical switches 23C-1 to 23C-n are provided for the respective demultiplexed wavelengths, and switch (perform switching) between the optical signal (Thru-side) having a single wavelength outputted from the Demux 23B and the optical signal (Add-side) transmitted from the OLC 201 to output either of the optical signals.

The VOAs 23D-1 to 23D-n are provided for the respective demultiplexed wavelengths, and perform a level control for the respective wavelengths outputted from the optical switches 23C-1 to 23C-n. For example, the VOAs 23D-1 to 23D-n adjust the optical signals of all the wavelengths to have the same level in order to output the optical signals. The Mux 23E multiplexes the optical signals of n wavelengths which have been level-adjusted to generate a new WDM main signal.

The post-amp 21B-2 amplifies the WDM main signal outputted from the Mux 23E. The OSC part 2C converts operation monitoring information and the like concerning the local station transmitted from the control part 25 into light by the E/O 2C-2 to generate the OSC signal.

The OSC coupler 21A-2 multiplexes the WDM main signal amplified by the post-amp 21B-2 and the OSC signal transmitted from the OSC part 2C to generate the WDM signal, and transmits the WDM signal to the ring network via the upward optical fiber FU-2.

Next, the configuration and operation when the function of the measurement apparatus 10 is applied to the OADM 20 in a terminal station and when the function of the opposite apparatus 3 is applied to a relay station will be described.

Figure 5:
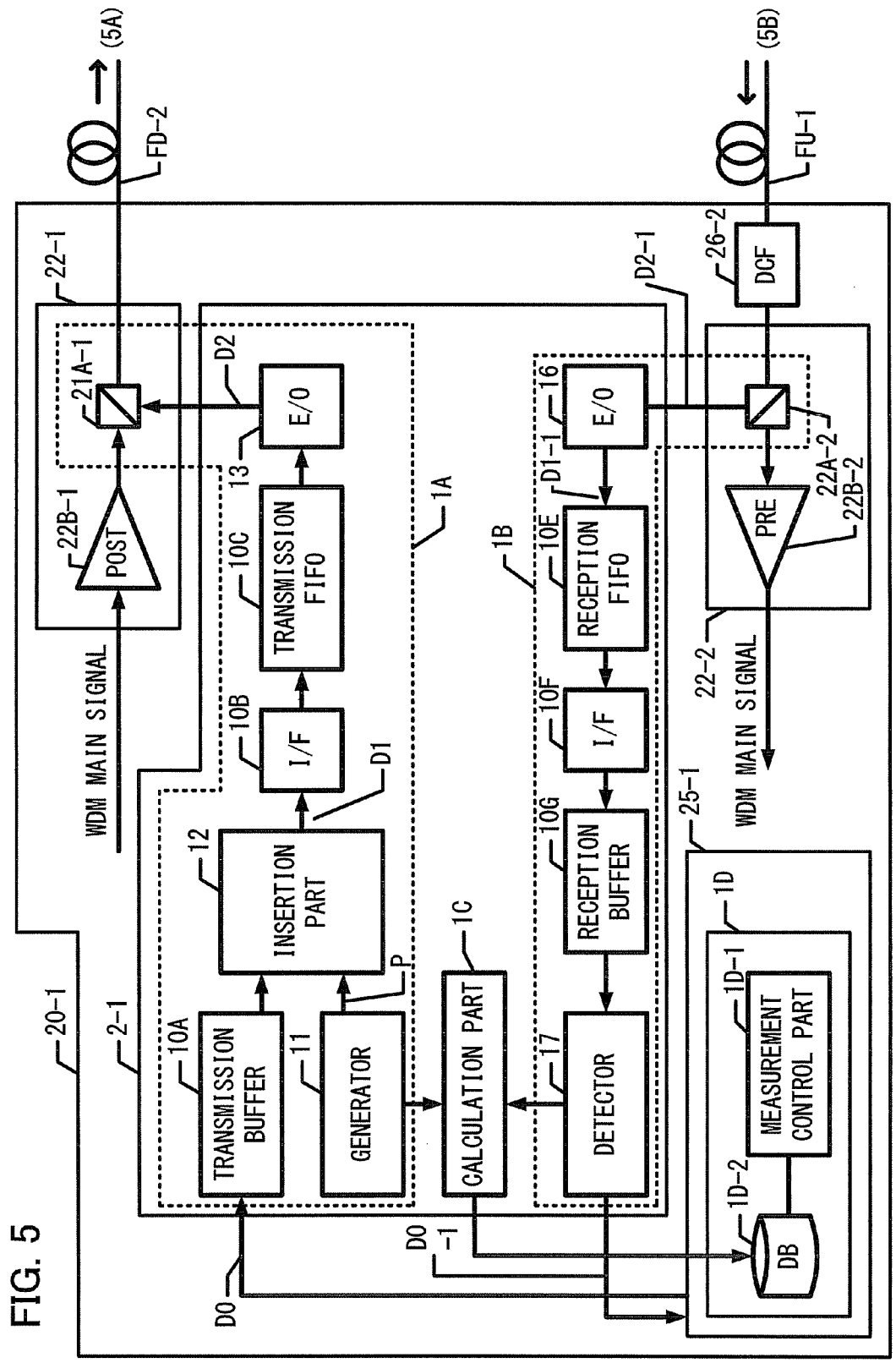
FIG. 5 is a diagram illustrating a configuration in which a function of a measurement apparatus is applied to the OADM.

FIG. 5 is a diagram illustrating the configuration when the function of the measurement apparatus 10 is applied to the OADM 20.

Figure 6:
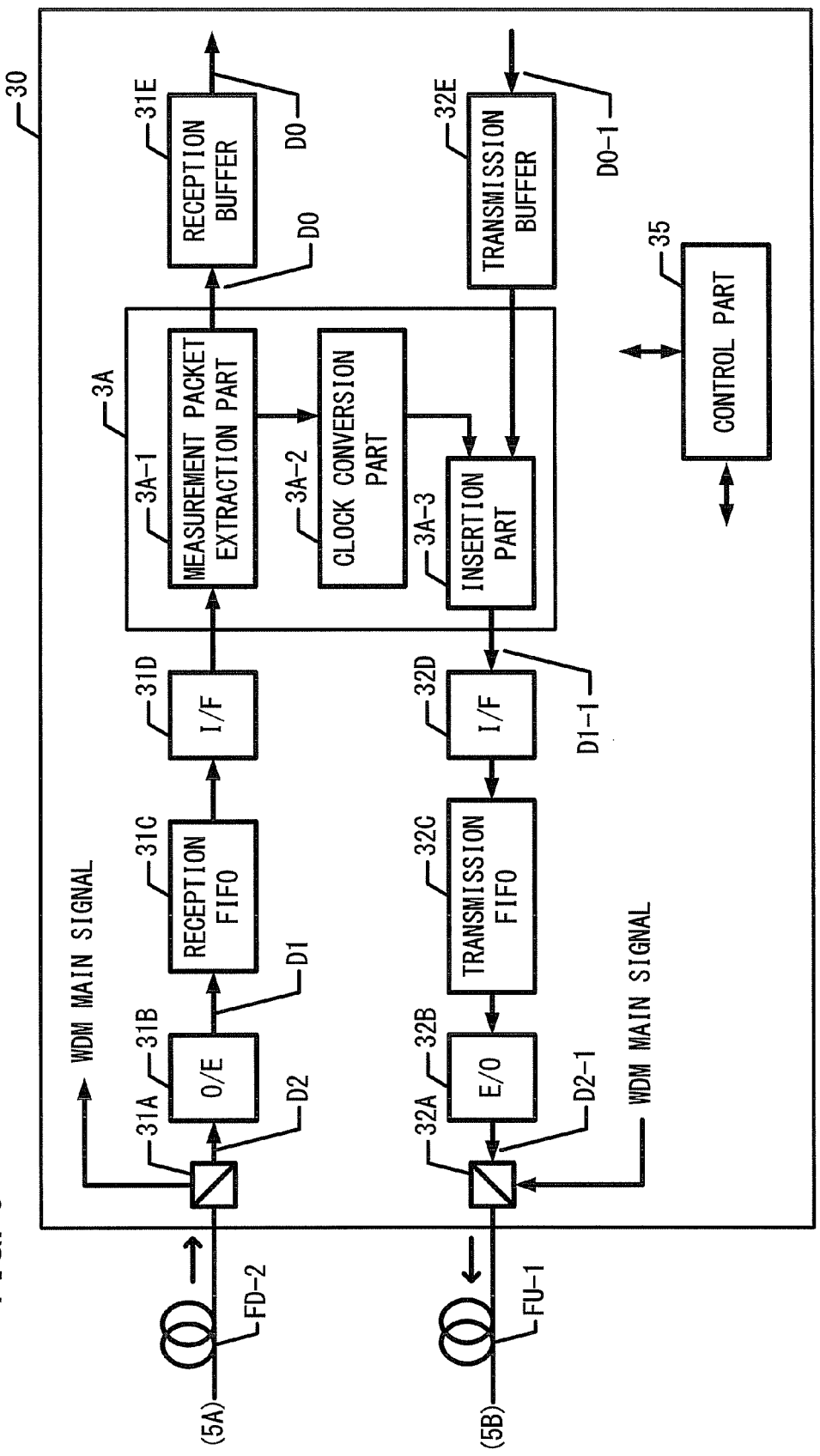
FIG. 6 is a diagram illustrating a configuration in which a function of an opposite apparatus is applied to a relay station.

FIG. 6 is a diagram illustrating the configuration when the function of the opposite apparatus 3 is applied to a relay station.

The OADM 20-1 functions as the measurement apparatus 10 includes an OSC part 2-1, a post-amp module 22-1, a pre-amp module 22-2, a control part 25-1, and the DCF 26-2. (only configuration elements necessary for description are illustrated in FIG. 5)

The OSC part 2-1 (corresponding to the OSC part 2 in FIG. 4) includes a transmission buffer 10A, a measurement packet generation part (generator) 11, an insertion part 12, an I/F (interface part) 10B, a transmission FIFO (First In First Out) 10C, an E/O 13, an O/E 16, a reception FIFO 10E, an I/F 10/F a reception buffer 10G, a measurement packet detection part (detector) 17, and a calculation part 1C.

The control part 25-1 (corresponding to the control part 25 in FIG. 3) includes the measurement part 1D. The measurement part 1D includes a measurement control part 1D-1 and a database 1D-2.

The post-amp module 22-1, the pre-amp module 22-2, and the DCF 26-2 are substantially the same configuration elements as those of FIG. 4.

The OSC coupler 22A-1 corresponds to the multiplexer 14 in FIG. 1, and the OSC coupler 22A-2 corresponds to the demultiplexer 15 in FIG. 1. Blocks corresponding to the transmission part 1A and the reception part 1B in the measurement apparatus 10 illustrated in FIG. 1 are surrounded with a dotted line for ease of understanding.

In FIG. 6, the relay apparatus 30 in a relay station includes an OSC coupler 31A, an O/E 31B, a reception FIFO 31C, an I/F 31D, a reception buffer 31E, an OSC coupler 32A, an E/O 32B, a transmission FIFO 32C, an I/F 32D, a transmission buffer 32E, a loopback part 3A, and a control part 35. The loopback part 3A includes a measurement packet extraction part 3A-1, a clock conversion part 3A-2, and an insertion part 3A-3. The control part 35 performs an overall control of the configuration elements in the relay station.

An operation of each configuration element related to the measurement of the optical fiber transmission line will be described.

In FIG. 5, the transmission buffer 10A performs buffering of the monitoring control signal (an original signal of the OSC signal which has not yet been converted to light) D0 transmitted from the control part 25-1. The measurement packet generation part (generator) 11 generates a measurement packet P.

The insertion part 12 inserts a measurement packet P into the monitoring control signal D0 which has been buffered, to generate a packet insertion signal D1.

The packet insertion signal D1 is transmitted to the transmission FIFO 10C via the I/F 10B and accumulated in the transmission FIFO 10C.

The E/O 13 converts the packet insertion signal D1 outputted from the transmission FIFO 10C into light to generate an optical monitoring control signal (an OSC signal including the measurement packet P, the OSC signal is called an OSC signal D2).

The OSC coupler 22A-1 multiplexes the WDM main signal amplified by the post-amp 22B-1 and the OSC signal D2 to generate the WDM signal, and transmits the WDM signal to the opposite relay station via the downward optical fiber FD-2.

In the relay apparatus 30 of the relay station illustrated in FIG. 6, the OSC coupler 31A branches the WDM signal into the WDM main signal and the OSC signal D2. The O/E 31B converts the OSC signal D2 into electricity to generate the packet insertion signal D1. The reception FIFO 31C accumulates the packet insertion signal D1.

The packet insertion signal D1 outputted form the reception FIFO 31C is transmitted to the measurement packet extraction part 3A-1 via the I/F 31D, and the measurement packet extraction part 3A-1 extracts the measurement packet P form the packet insertion signal D1.

The reception buffer 31E performs buffering of the monitoring control signal D0 from which the measurement packet P is removed, and thereafter transmits the monitoring control signal D0 to a subsequent processing part.

The clock conversion part 3A-2 converts a clock of the measurement packet P (converts frequency of the clock into a clock frequency used by the relay apparatus 30).

The transmission buffer 32E performs buffering of the monitoring control signal D0-1 transmitted from a former processing part. The insertion part 3A-3 inserts a measurement packet P, the clock of which has been converted, into the monitoring control signal D0-1 which has been buffered, to generate a packet insertion signal D1-1.

The packet insertion signal D1-1 is transmitted to the transmission FIFO 32C via the I/F 32D, and the transmission FIFO 32C accumulates the packet insertion signal D1-1. The E/O 32B converts the packet insertion signal D1-1 outputted from the transmission FIFO 32C into light to generate the OSC signal D2-1 including the measurement packet P.

The OSC coupler 32A multiplexes the WDM main signal and the OSC signal D2-1 to generate the WDM signal, and transmits the WDM signal to a terminal station via the upward optical fiber FU-1.

In FIG. 5, the DCF 26-2 in the OADM 20-1 receives the WDM signal and performs a dispersion compensation.

The OSC coupler 22A-1 branches the WDM signal which has been dispersion-compensated into the WDM main signal and the OSC signal D2-1.

The O/E 16 converts the OSC signal D2-1 into electricity to generate the packet insertion signal D1-1.

The reception FIFO 10E accumulates the packet insertion signal D1-1.

The packet insertion signal D1-1 transmitted from the reception FIFO 10E is transmitted to the reception buffer 10G via the I/F 10F, and the reception buffer 10G performs buffering of the packet insertion signal D1-1.

The measurement packet detection part (detector) 17 detects the measurement packet P from the packet insertion signal D1-1. The monitoring control signal D0-1 from which the measurement packet P is removed is transmitted to the control part 25-1.

The calculation part 1C calculates the packet transmission time on the basis of the time when the measurement packet P is generated in the measurement packet generation part (generator) 11 and the time when the measurement packet P is detected in the measurement packet detection part (detector) 17, and transmits the packet transmission time to the measurement part 1D. The database 1D-2 stores the packet transmission time and parameter values necessary for measuring the optical fiber transmission line, and the measurement control part 1D-1 performs measurement control of the optical fiber transmission line by using various information stored in the database 1D-2.

Next, as the measuring of the optical fiber transmission line, the operation of measuring the length of the optical fiber will be described in detail. The measurement control varies depending on whether the measurement packet P passes through the DCF. When the measurement packet p passes through the DCF, the DCF length information is required, and when the measurement packet P does not pass through the DCF, the DCF length information is not required.

In FIG. 5, since the DCF 26-2 is arranged at the input stage of the OSC coupler 22A-2, and the measurement packet P passes through the DCF 26-2, so the DCF length information is necessary to measure the length of the optical fiber transmission line.

The case in which the measurement packet P does not pass through the DCF is, for example, a case in which a pre-amp with a DCF built-in, such as the pre-amp 22B-2 which has the DCF built-in, is used. In this case, since the measurement packet P is branched before being inputted into the DCF (pre-amp) by the OSC coupler 22A-2, the optical fiber length measurement without using the DCF length information is applied.

Figure 7:
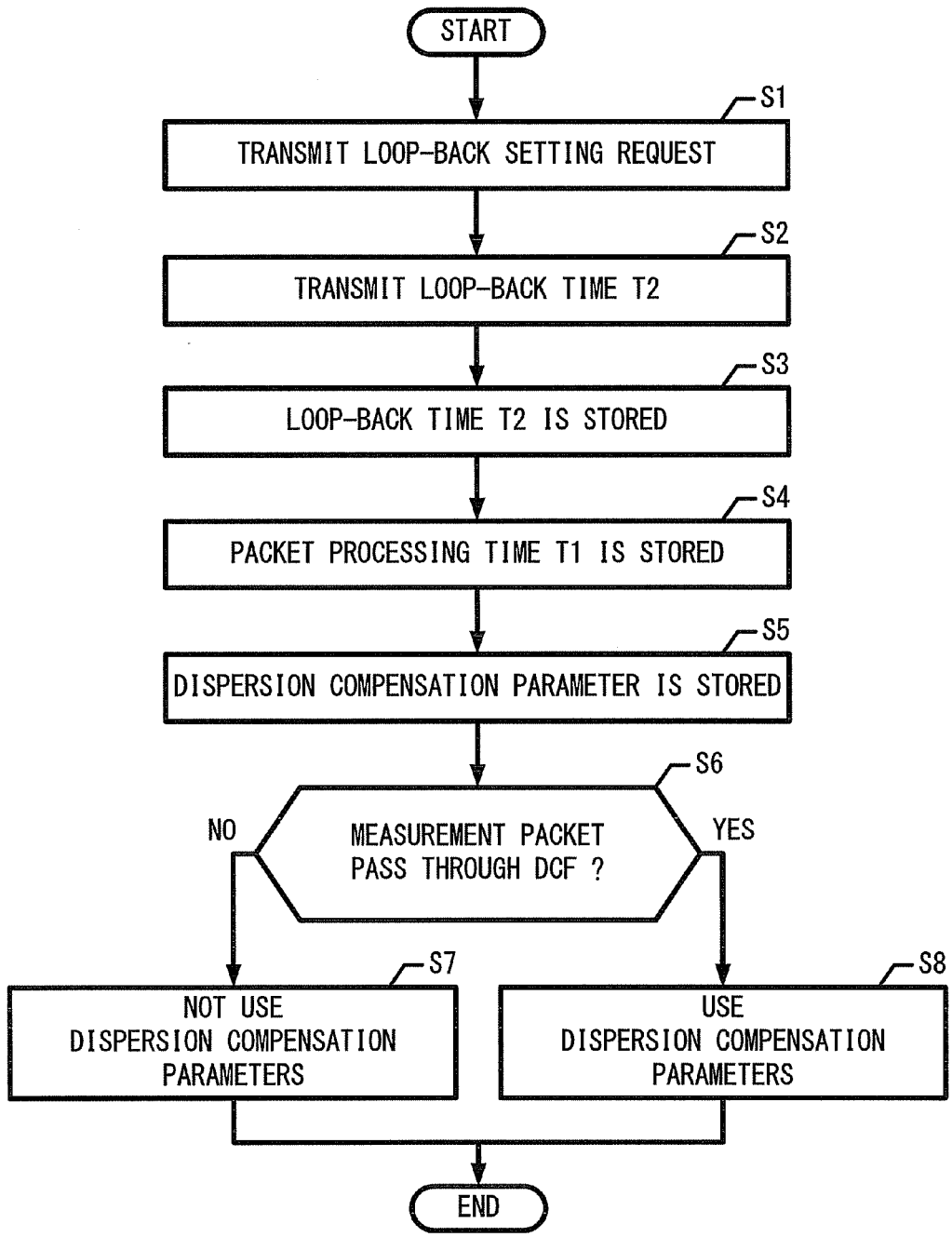
FIG. 7 is a flowchart illustrating a preparation operation before an optical fiber length measurement.

FIG. 7 is a flowchart illustrating a preparation operation before the optical fiber length measurement.

[S1] A maintenance person inputs a measurement start command into the maintenance terminal 202 on the measurement side (OADM 20-1 illustrated in FIG. 5). The control part 25-1 in the OADM 20-1 recognizes the measurement start command, and a loop-back setting request is transmitted from the measurement side to the opposite side (the relay apparatus 30) by a normal OSC signal.

[S2] The relay apparatus 30 (control part 35 illustrated in FIG. 6) performs a loop-back setting of the measurement packet P and transmits a loop-back time T2 to the OADM 20-1 on the measurement side (the transmission of the loop-back time T2 is performed by the OSC signal generated in the relay station). The loop-back time T2 is a time required for a loop-back processing from when the measurement packet P arrives at the relay apparatus 30 to when the measurement packet P is transmitted from the upward optical fiber FU-1.

[S3] The loop-back time T2 is stored in the database 1D-2 on the OADM 20-1 of the measurement side.

[S4] It is stored in the database 1D-2 that a packet processing time T1 which is a sum of a processing time required from the generation of the measurement packet P to the transmission of the measurement packet P to the downward optical fiber FD-2, and a processing time from when the measurement packet P arrives at the OADM 20-1 to when the measurement packet P is detected.

[S5] Various parameters related to the dispersion compensation fibers (DCF 26-2) provided on the upward optical fiber FU-1 side are stored in the database 1D-2. As dispersion compensation parameters of the DCF 26-2, for example, there are dispersion quantity, dispersion coefficient, dispersion quantity variation, DCF length, production tolerance of DCF length, and the like.

[S6] In case of the apparatus configuration in which the measurement packet P does not pass through the DCF, the process goes to step S7, and in case of the apparatus configuration in which the measurement packet P passes through the DCF, the process goes to step S8.

[S7] Preparation for the optical fiber length measurement without using the dispersion compensation parameters is completed.

[S8] Preparation for the optical fiber length measurement using the dispersion compensation parameters is completed.

In FIG. 5, since the DCF 26-2 is arranged at the input stage of the OSC coupler 22A-2, and the measurement packet P passes through the DCF 26-2, the optical fiber length measurement uses the dispersion compensation parameters.

Figure 8:
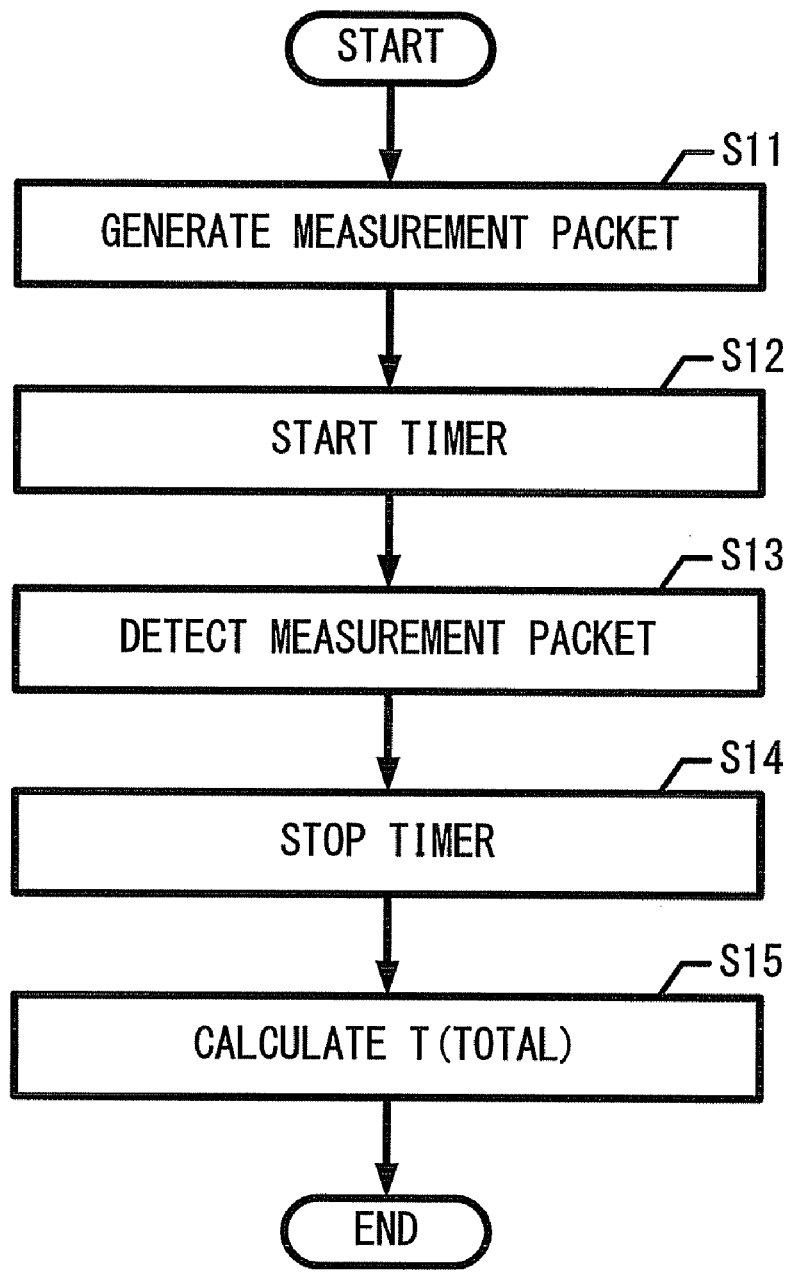
FIG. 8 is a flowchart illustrating an operation of calculating a packet transmission time.

FIG. 8 is a flowchart illustrating an operation of calculating the packet transmission time.

[S11] The measurement packet generation part (generator) 11 generates the measurement packet P.

[S12] The calculation part 1C starts a timer counter when the measurement packet P is generated (the start time is defined as t1).

[S13] The measurement packet detection part (detector) 17 detects the measurement packet P from the packet insertion signal D1-1 which has returned.

[S14] The calculation part 1C stops the timer counter when the measurement packet P is detected (the stop time is defined as t2).

Figure 9:
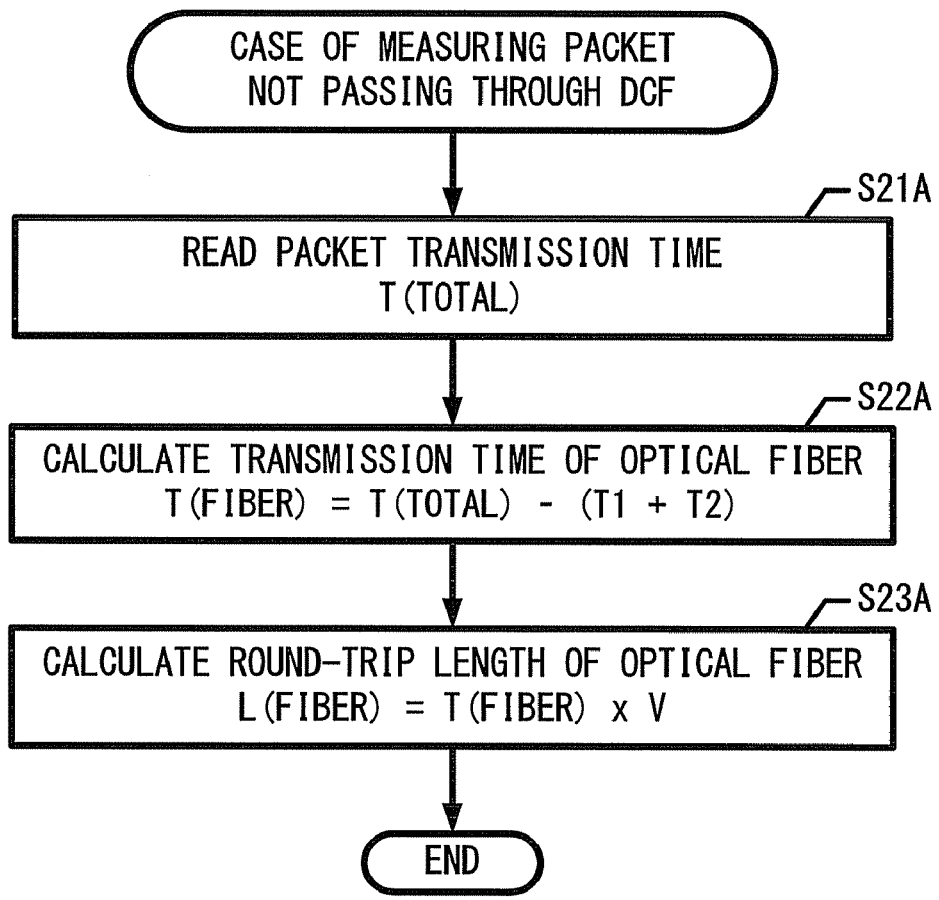
FIG. 9 is a flowchart illustrating an operation of an optical fiber length measurement without using dispersion compensation parameters.
Figure 10:
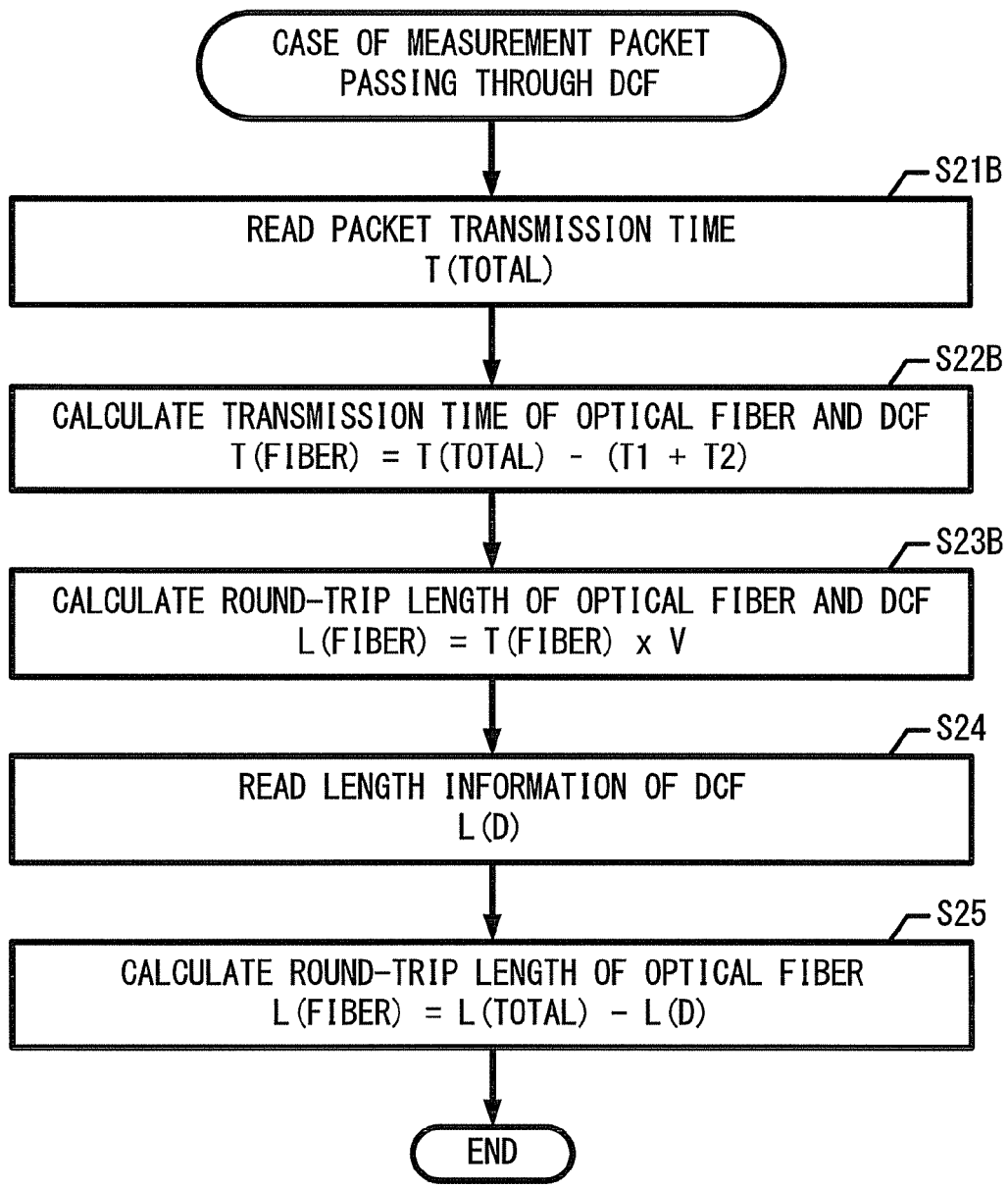
FIG. 10 is a flowchart illustrating an operation of an optical fiber length measurement using dispersion compensation parameters.

[S15] The calculation part 1C subtracts the start time t1 from the stop time t2 to obtain the packet transmission time (packet transmission time is defined as Ttotal (T(TOTAL) illustrated in FIGS. 8-10)).

FIG. 9 is a flowchart illustrating an operation of the optical fiber length measurement without using the dispersion compensation parameters. This is a measurement flow when the measurement packet P does not pass through the DCF.

[S21A] The measurement control part 1D-1 reads the packet transmission time Ttotal from the database 1D-2.

[S22A] The measurement control part 1D-1 calculates a transmission time Tfiber (T(FIBER) illustrated in FIGS. 9-10) when the measurement packet P is transmitted in the downward optical fiber FD-2 and the upward optical fiber FU-1. The calculation formula is the following formula (1a):

$$T\text{fiber}=T\text{total}-(T1+T2) \quad (1a)$$

[S23A] The measurement control part 1D-1 calculates the length of the downward optical fiber FD-2 and the length of the upward optical fiber FU-1 (the round-trip length of the optical fibers) Lfiber (L(FIBER) illustrated in FIGS. 9-10). The calculation formula is the following formula (2) when the light speed in the optical fiber is defined as V, wherein, V=Co/ng, Co is the light speed in vacuum, and ng is the group refractive index.

$$L\text{fiber}=T\text{fiber}\times V=T\text{fiber}\times Co/ng \quad (2)$$

FIG. 10 is a flowchart illustrating an operation of the optical fiber length measurement using the dispersion compensation parameters. This is a measurement flow when the measurement packet P passes through the DCF 26-2, as illustrated in FIG. 5.

[S21B] The measurement control part 1D-1 reads the packet transmission time Ttotal from the database 1D-2.

[S22B] The measurement control part 1D-1 calculates the transmission time Tfiber when the measurement packet P is transmitted in the downward optical fiber FD-2, the upward optical fiber FU-1, and the DCF 26-2, by using the following formula (1b):

$$T\text{fiber}=T\text{total}-(T1+T2) \quad (1b)$$

[S23B] The measurement control part 1D-1 calculates the length Ltotal which is the length of the downward optical fiber FD-2 and the upward optical fiber FU-1 (the round-trip length of the optical fibers) and the length of the DCF 26-2, by using the following formula (3):

$$L\text{total}=T\text{fiber}\times Co/ng \quad (3)$$

[S24] The measurement control part 1D-1 reads the DCF length information (L(D)) illustrated in FIG. 10) in the dispersion compensation parameters from the database 1D-2.

[S25] The measurement control part 1D-1 calculates the length of the downward optical fiber FD-2 and the upward optical fiber FU-1 (the round-trip length of the optical fibers) Lfiber, by the following formula (4), when the DCF length information is Ld, wherein, Ld=Ldcf+ΔLdcf, Ldcf is the length of the DCF 26-2, and ΔLdcf is the production tolerance of length of the DCF 26-2.

$$L\text{fiber}=L\text{total}-Ld=L\text{total}-(Ldcf+\Delta Ldcf) \quad (4)$$

Although the time Ttotal and the time T1 in the formula (1a) in step S22A do not include the time in which the measurement packet passes through the DCF, the time Ttotal and the time T1 in the formula (1b) in step S22B include the time in which the measurement packet passes through the DCF 26-2.

Next, the format of the packet insertion signal in which the measurement packet P is inserted into the monitoring control signal will be described. The OSC signal has a frame structure compatible with SDH/SONET (Synchronous Digital Hierarchy/Synchronous Optical Network), and the measurement packet P may be inserted into a payload part of the SDH/SONET frame as a PoS (Packet on SONET) frame. In other words, a signal in which the measurement packet is inserted into the SDH/SONET frame is the packet insertion signal.

Figure 11:
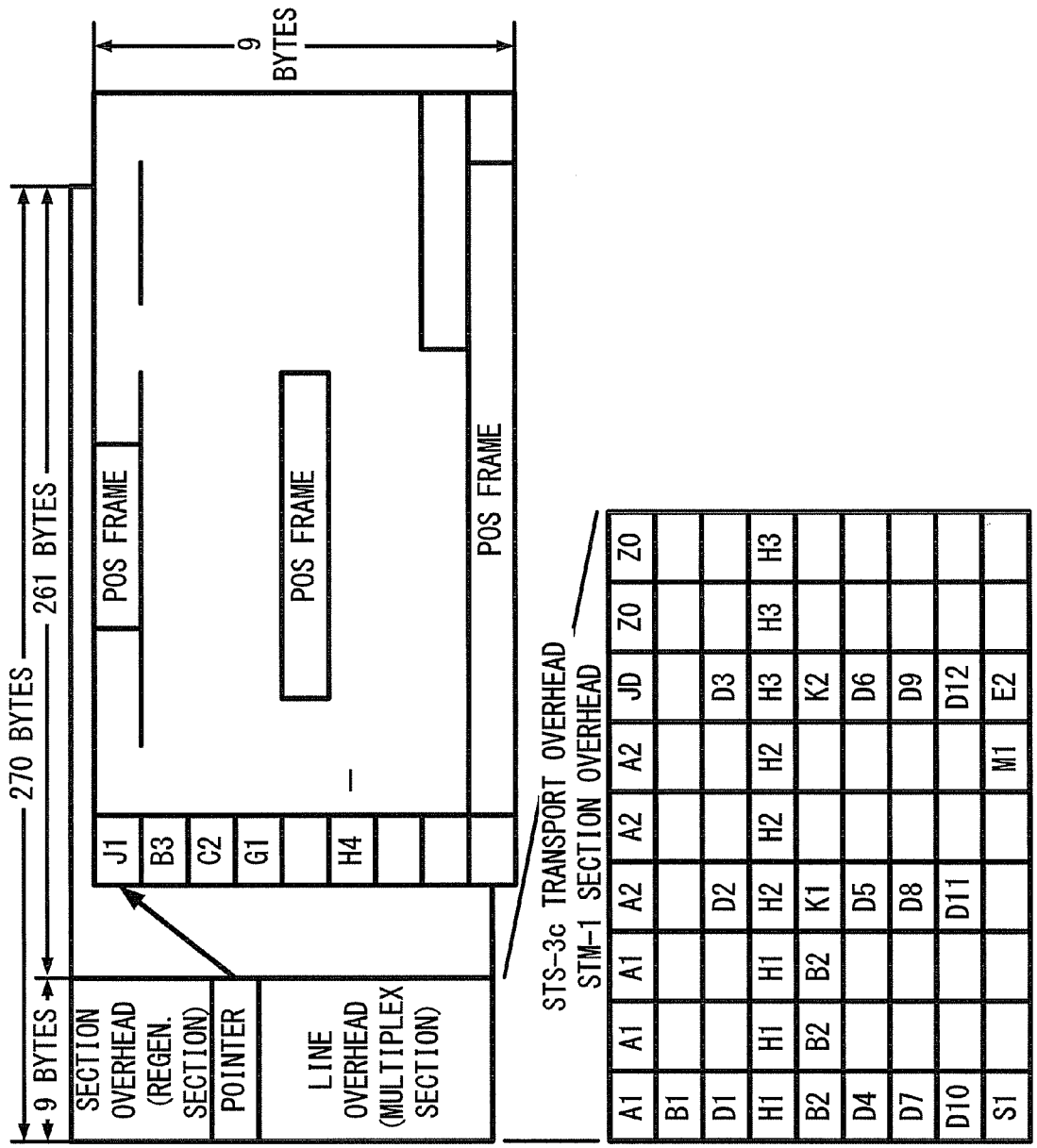
FIG. 11 is a diagram illustrating a format of a SONET frame.

FIG. 11 is a diagram illustrating the format of the SONET frame. The measurement packet P is inserted into the payload part of the SONET frame as the PoS frame. The measurement packet P is allocated arbitrarily. For example, unique data such as a timestamp, an apparatus name, or the like is used for the measurement packet P.

As described above, in the optical fiber transmission line measurement system 1, since the configuration in which the measurement packet is superimposed onto the OSC signal, the OSC signal is returned from the opposite side, the packet transmission time is obtained, and the optical fiber length is measured is employed, it is possible to measure the optical fiber length without stopping services even when the system is in operation. In addition, since it is an automatic measurement without using an optical measuring instrument of OTDR in other words, the optical fiber length is automatically measured only by a user inputting the measurement start command into the maintenance terminal 202 when starting the measurement, efficiency of maintenance is significantly improved.

Second Embodiment

Next, modified examples of the optical fiber length measurement will be described. A modified example of the optical fiber length measurement is to measure a one-way length of the optical fiber. In the above described optical fiber measurement, since a round-trip length of the optical fibers in upward and downward directions is obtained, when a one-way length is required, an average of the upward and downward lengths is obtained in other words, a value obtained by dividing the round-trip length Lfiber by 2 is determined to be the length of each of the upward and downward optical fibers.

In actual optical networks, since it is rare that there is a large difference between the upward and downward optical fiber lengths, the above described optical fiber measurement is practically sufficient in many cases. However, when a one-way optical fiber length needs to be measured more precisely, it is measured by the modified example described below.

Figure 12:
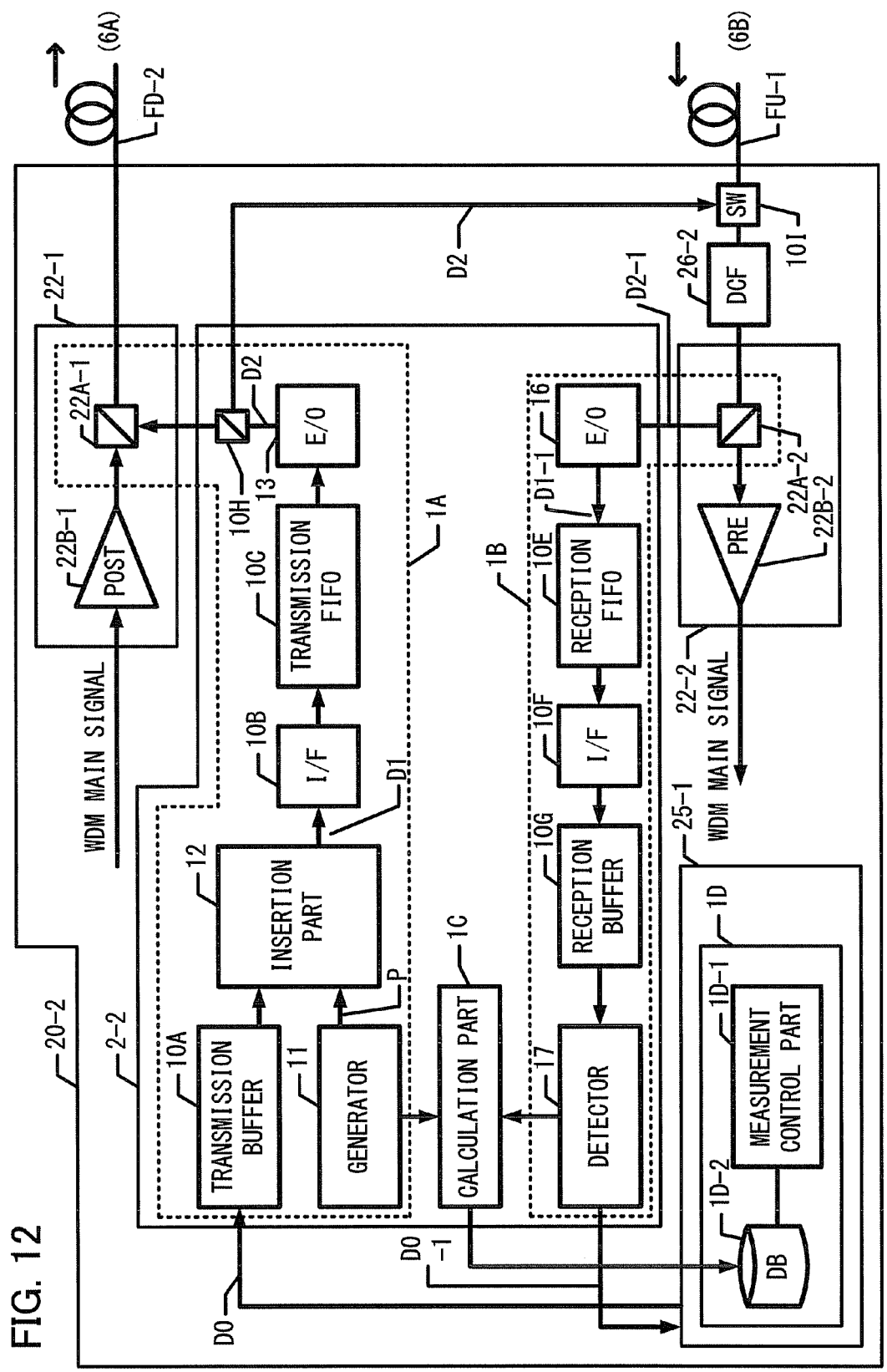
FIG. 12 is a diagram illustrating a configuration of a modified example which measures a one-way length of an optical fiber transmission line.
Figure 13:
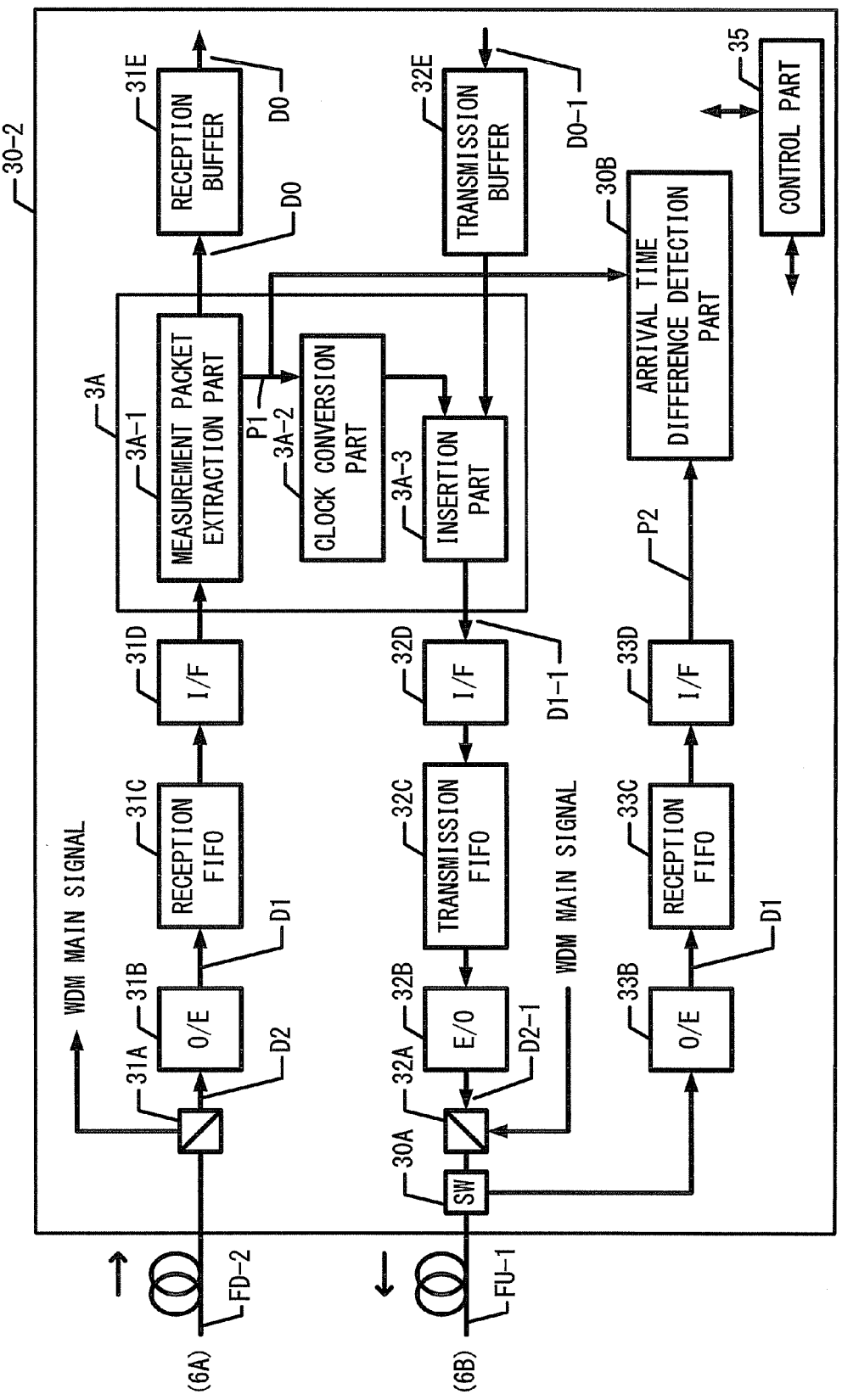
FIG. 13 is a diagram illustrating a configuration of a modified example which measures a one-way length of an optical fiber transmission line.

FIGS. 12 and 13 are diagrams illustrating a configuration of a modified example which measures a one-way length of the optical fiber transmission line. The same elements as in FIGS. 5 and 6 are denoted by the same reference symbols as those in FIGS. 5 and 6, and descriptions thereof are omitted. In the OADM 20-2, a measurement side coupler (coupler 10H) is provided at the output stage of the E/O 13 of the OSC part 2-2. Also, a measurement side optical switch (optical switch 10I) is connected to the upward optical fiber FU-1.

The relay part 30-2 additionally has a function of an arrival time difference detection part 30B, and an opposite side optical switch (optical switch 30A) is connected to the upward optical fiber FU-1. Furthermore, the O/E 33B, the reception FIFO 33C, and the I/F 33D are provided.

The coupler 10H branches the OSC signal D2 outputted from the E/O 13 into two signals, transmits one signal to the OSC coupler 22A-1, and transmits the other signal to the optical switch 10I. The optical switch 10I switches the switch direction to a transmission state or a reception state on the basis of a switching instruction from the measurement control part 1D-1.

In the optical switch 10I, when the switch is switched to the transmission state, the OSC signal D2 branched from the coupler 10H is transmitted to the relay station via the upward optical fiber FU-1. When the switch is switched to the reception state, the WDM signal transmitted from the relay station is received and transmitted to the DCF 26-2.

The switch state in a normal operation of the optical switch 10I is the reception state. The optical switch 10I is switched to the transmission state only when it is attempted to detect an arrival time difference of the measurement packet so as to measure the one-way length of the optical fiber transmission line.

The optical switch 30A of the relay part 30-2 switches the switch direction to a transmission state or a reception state on the basis of a switching instruction from the control part 35.

In the optical switch 30A, when the switch is switched to the transmission state, the WDM signal transmitted from the OSC coupler 32A is transmitted to the OADM 20-2 via the upward optical fiber FU-1.

When the switch is switched to the reception state, the OSC signal D2 (OSC signal outputted from the optical switch 10I illustrated in FIG. 12) transmitted from the OADM 20-2 is received at the optical switch 30A and transmitted to the O/E 33B.

The switch state in a normal operation of the optical switch 30A is the transmission state. The optical switch 30A is switched to the reception state only when it is attempted to detect the arrival time difference of the measurement packet so as to measure the one-way length of the optical fiber transmission line.

Figure 14:
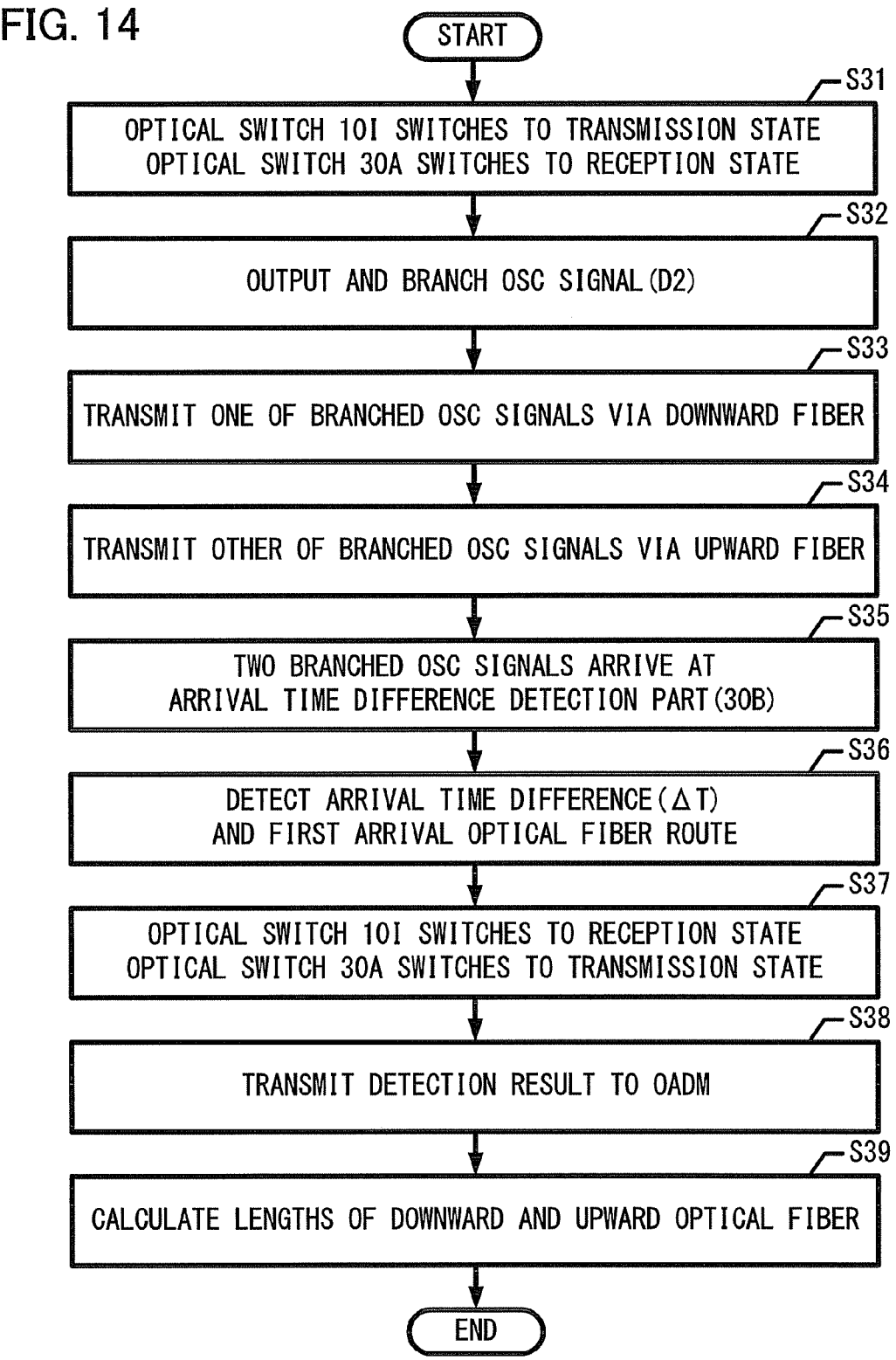
FIG. 14 is a flowchart illustrating an operation of measuring a one-way length of an optical fiber.

FIG. 14 is a flowchart illustrating the operation of measuring a one-way length of the optical fiber transmission line.

[S31] The optical switch 10I switches to the transmission state, and the optical switch 30A switches to the reception state. The switch settings of the optical switches 10I and 30A may be set through the maintenance terminal 202.

In other words, when a switch setting command is inputted from the maintenance terminal 202, the optical switch 10I switches to a predetermined switch state by the control of the measurement control part 1D-1. Regarding the optical switch 30A, switch setting information of the optical switch 30A is inserted into the OSC signal generated in the OADM 20-2 (terminal station), and the OSC signal is transmitted to the relay station. The control part 35 in the relay part 30-2 recognizes contents of the transmitted OSC signal, and sets the optical switch 30A to a predetermined state.

[S32] The E/O 13 outputs the OSC signal D2 including the measurement packet P, and the OSC signal D2 is branched into two signals in the coupler 10H.

[S33] One of the branched OSC signals D2 (corresponding to the first optical monitoring control signal) is transmitted to the relay station via the OSC coupler 22A-1 and the downward optical fiber FD-2.

[S34] The other of the branched OSC signals D2 (corresponding to the second optical monitoring control signal) is transmitted to the relay station via the optical switch 10I and the upward optical fiber FU-1.

[S35] The measurement packet transmitted via the downward optical fiber FD-2 and the measurement packet transmitted via the upward optical fiber FU-1 arrive at the arrival time difference detection part 30B.

Regarding the OSC signal D2 transmitted via the downward optical fiber FD-2, the OSC signal D2 is transmitted to the O/E 31B via the OSC coupler 31A and converted into an electric packet insertion signal D1 in the O/E 31B, and the packet insertion signal D1 is accumulated in the reception FIFO 31C, as illustrated in FIG. 13.

The packet insertion signal D1 outputted from the reception FIFO 31C is inputted into the measurement packet extraction part 3A-1 via the I/F 31D, and the extracted measurement packet (corresponding to the first measurement packet, and defined as a measurement packet P1) is inputted into the arrival time difference detection part 30B.

On the other hand, regarding the OSC signal D2 transmitted via the upward optical fiber FU-1, the OSC signal D2 is transmitted to the O/E 33B via the optical switch 30A and converted into an electric packet insertion signal D1 in the O/E 33B, and the packet insertion signal D1 is accumulated in the reception FIFO 33C.

The packet insertion signal D1 outputted from the reception FIFO 33C is inputted into the arrival time difference detection part 30Bb via the I/F 33D. The arrival time difference detection part 30B extracts the measurement packet (corresponding to the second measurement packet, and defined as a measurement packet P2) from the packet insertion signal D1.

[S36] The arrival time difference detection part 30B detects the arrival time difference $\Delta T$ between the measurement packets P1 and P2. The arrival time difference detection part 30B detects the first arrival optical fiber route, namely detects which arrived first between the measurement packet of the upward optical fiber and the measurement packet of the downward optical fiber.

[S37] The optical switch 30A switches to the transmission state, and the optical switch 10I switches to the reception state. As described above, only when it is attempted to detect the arrival time difference of the measurement packets, the optical switch 10I is in the transmission state and the optical switch 30A is in the reception state. Therefore, in any time period other than the above, the optical switch 10I is in the reception state and the optical switch 30A is in the transmission state, which is a normal operation state.

[S38] The relay part 30-2 (control part 35 illustrated in FIG. 13) transmits the detection result of step S36 to the OADM 20-2 in the terminal station via the upward fiber FU-1 by using the OSC signal generated in the relay station.

[S39] When the length difference between the upward optical fiber FU-1 and the downward optical fiber FD-2 is defined as $\Delta L$, the measurement control part 1D-1 calculates a length La of the downward optical fiber FD-2 and a length Lb of the upward optical fiber FU-1 on the basis of the transmitted detection result $\Delta T$ by using the following formulas (5a) and (5b):

Here, Lfiber is the round-trip length of the downward optical fiber FD-2 and the upward optical fiber FU-1, which is obtained by the above formula (2) or (4). When the detection result indicates La>Lb, $\Delta L$=La−Lb is used, and when Lb>La, $\Delta L$=Lb−La is used.

$$\Delta L = \Delta T \times V = La - Lb(La > Lb) = Lb - La(Lb > La) \quad (5a)$$

$$Lfiber = La + Lb \quad (5b)$$

Here, in the one-way optical fiber length measurement, the measurement packet P2 is transmitted also from the upward optical fiber FU-1 to the relay station, and the relay station measures the arrival time difference between the measurement packets P1 and P2, so that normal services using the upward optical fiber FU-1 are halted.

However, since the halt time, namely time from when the measurement packet P2 is transmitted in the upward optical fiber FU-1 to when the arrival time difference is detected, is extremely short, normal services have no significant trouble. By comparison, when a conventional optical measurement apparatus is used, it takes a long time to perform a necessary measurement, due to installing the measurement apparatus, setting data, and the like, so that the service halt time becomes long.

Next, the measurement of the amount of dispersion will be described. When the optical fiber length is measured in the above described optical fiber length measurement, an average amount of dispersion in the optical fiber is obtained from an average amount of dispersion in each type of optical fiber.

Figure 15:
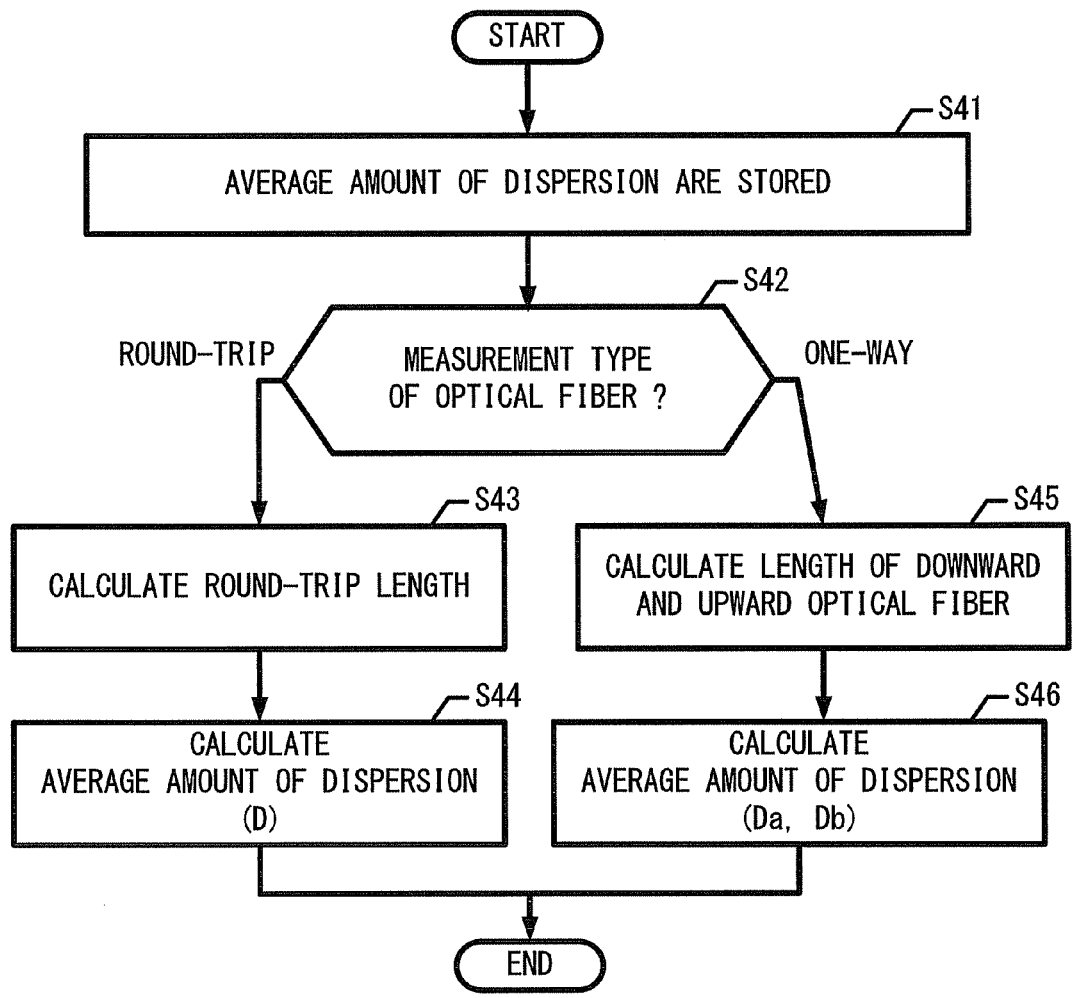
FIG. 15 is a flowchart illustrating a measurement operation of an amount of dispersion.

FIG. 15 is a flowchart illustrating the measurement operation of the amount of dispersion.

[S41] The average amount of dispersion (defined as dfiber) in the optical fiber type used for the downward optical fiber FD-2 and the upward optical fiber FU-1 are stored in the database 1D-2. For example, when an SMF (Single Mode Fiber) is used as the optical fiber, the average amount of dispersion in an SMF 17 ps/nm/km is stored in the database 1D-2.

[S42] When the sum of the length of the downward optical fiber FD-2 and the length of the upward optical fiber FU-1, namely the round-trip length of the optical fibers Lfiber is calculated, the process goes to step S43, and when the one-way length of each of the downward optical fiber FD-2 and the upward optical fiber FU-1 is calculated, the process goes to step S45.

[S43] The measurement control part 1D-1 calculates the optical fiber round-trip length Lfiber by using the above formula (2) or (4).

[S44] The measurement control part 1D-1 reads the average amount of dispersion dfiber from the database 1D-2, and calculates the average amount of dispersion D in each of the upward optical fiber FU-1 and the downward optical fiber FD-2 by using the following formula (6a):

$$D = L\text{fiber} \times d\text{fiber}/2 \qquad (6a)$$

[S45] The measurement control part 1D-1 calculates the length La of the downward optical fiber FD-2 and the length Lb of the upward optical fiber FU-1 by using the above formulas (5a) and (5b).

[S46] The measurement control part 1D-1 reads the average amount of dispersion dfiber from the database 1D-2, calculates the average amount of dispersion Da in the downward optical fiber FD-2 by using the following formula (6b-1), and calculates the average amount of dispersion Db in the upward optical fiber FU-1 by using the following formula (6b-2):

$$Da = La \times d\text{fiber} \qquad (6b\text{-}1)$$

$$Db = Lb \times d\text{fiber} \qquad (6b\text{-}2)$$

Next, a modified example of the measurement of the amount of dispersion will be described. In the above description, the amount of dispersion is obtained by using the average amount of dispersion in the optical fiber type used for the optical fiber transmission line. On the other hand, in the modified example, different wavelengths are transmitted in the optical fiber, and the amount of dispersion is obtained on the basis of the arrival time difference between the different wavelengths.

Figure 16:
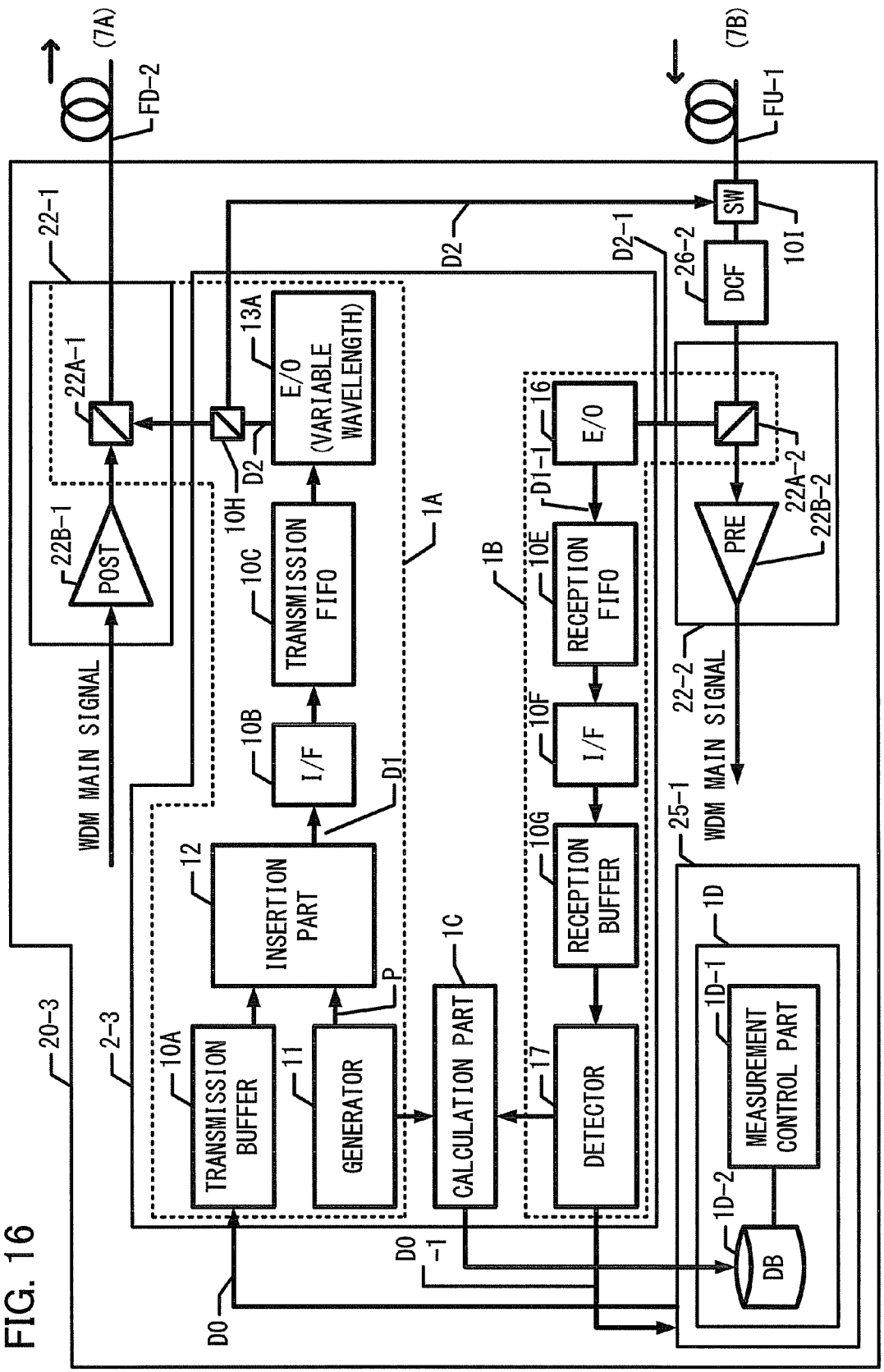
FIG. 16 is a diagram illustrating a configuration of a modified example which performs a measurement of an amount of dispersion.
Figure 17:
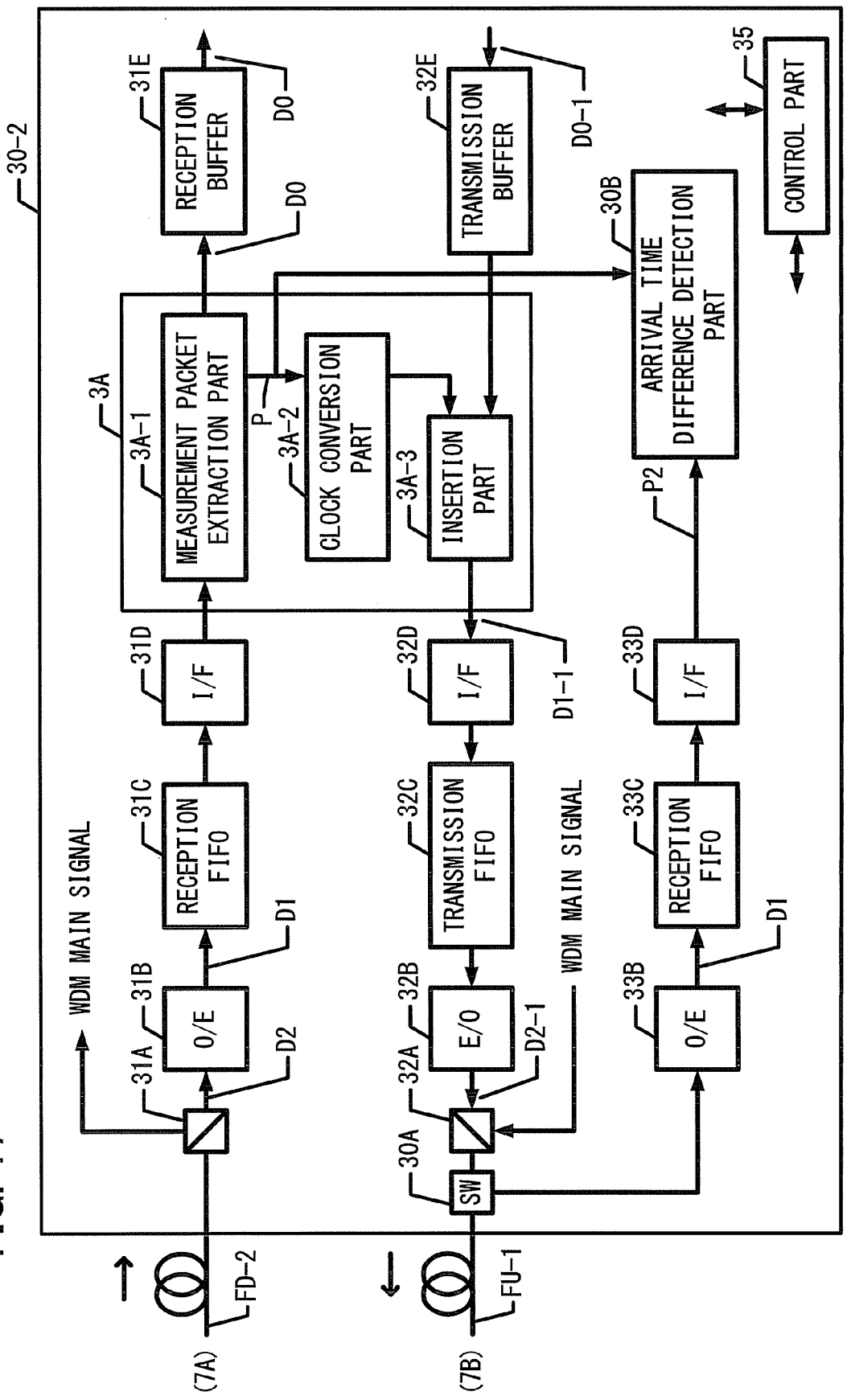
FIG. 17 is a diagram illustrating a configuration of a modified example which performs a measurement of an amount of dispersion.

FIGS. 16 and 17 are diagrams illustrating a configuration of the modified example which performs the measurement of the amount of dispersion. The OCS part 2-3 in the OADM 20-3 includes the E/O 13A having a wavelength variable function (wavelength-variable LD (Laser Diode)).

The E/O 13A outputs a wavelength $\lambda 1$ shorter than the shortest wavelength in the wavelength range used in optical communication, and a wavelength $\lambda 2$ longer than the longest wavelength in the wavelength range used in optical communication. The other configuration elements are the same as those in FIG. 12. The configuration of the relay station in FIG. 17 is the same as that in FIG. 13.

Figure 18:
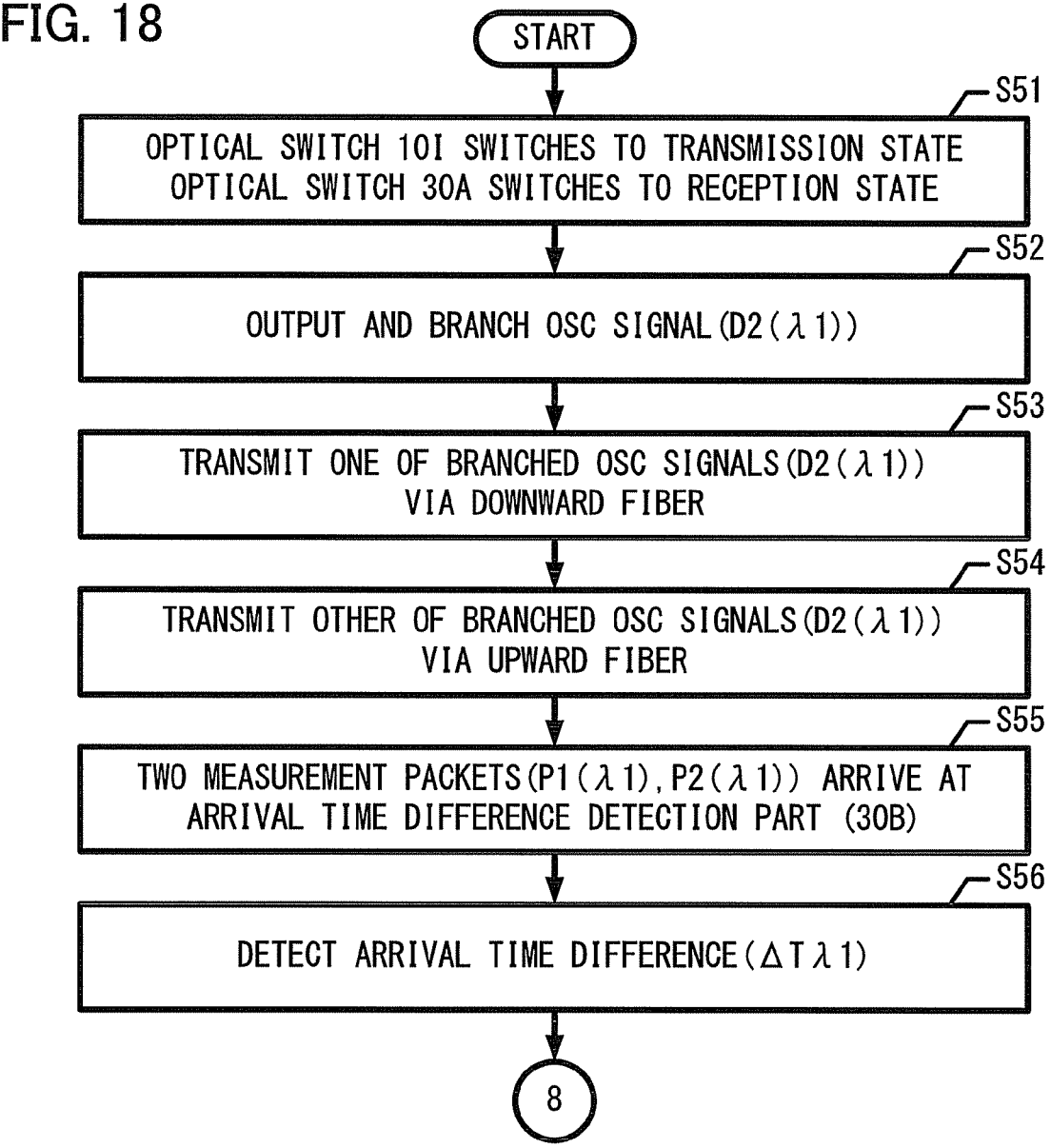
FIG. 18 is a flowchart illustrating a measurement operation of an amount of dispersion.
Figure 19:
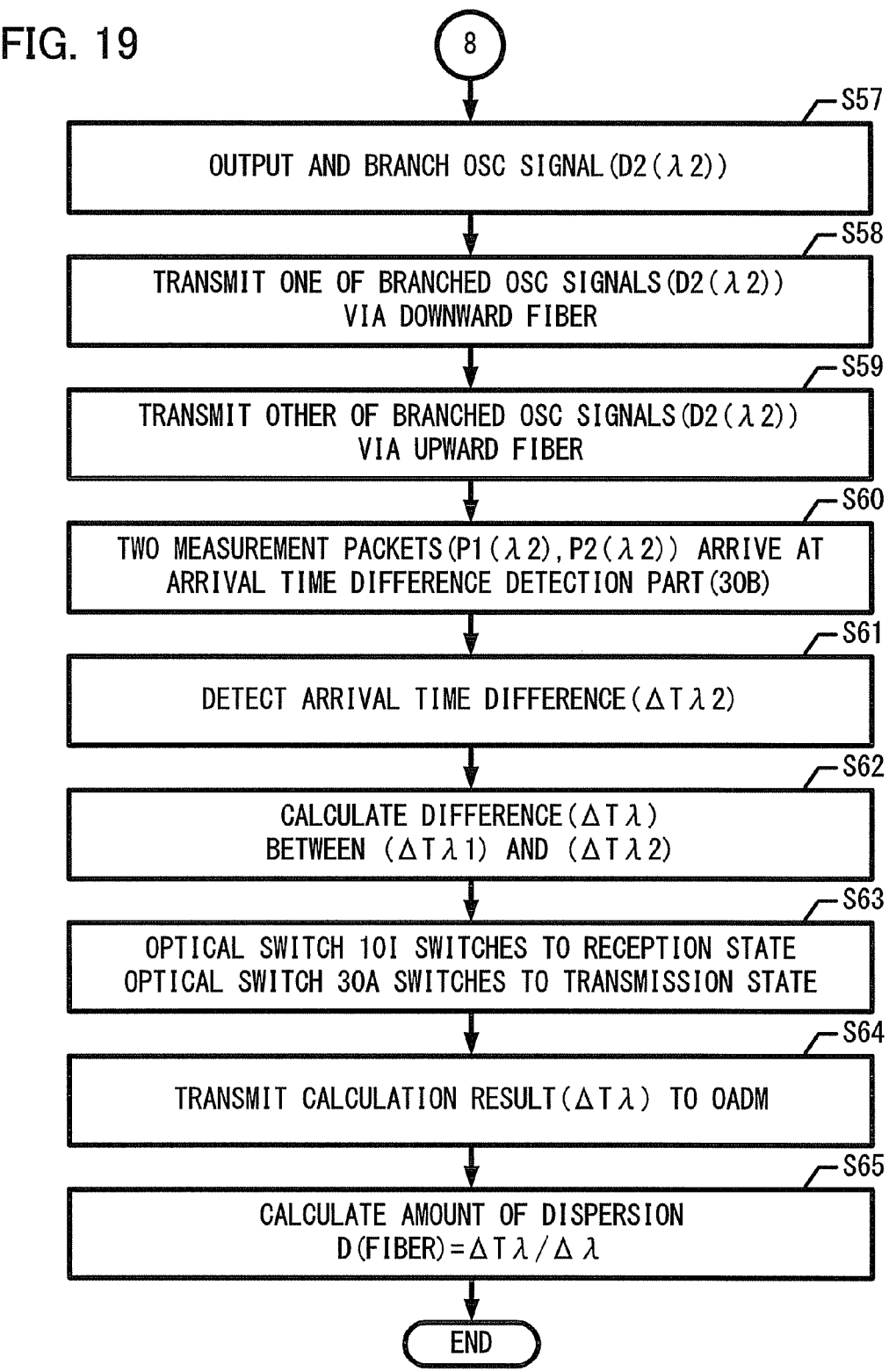
FIG. 19 is a flowchart illustrating a measurement operation of an amount of dispersion.
Figure 20:
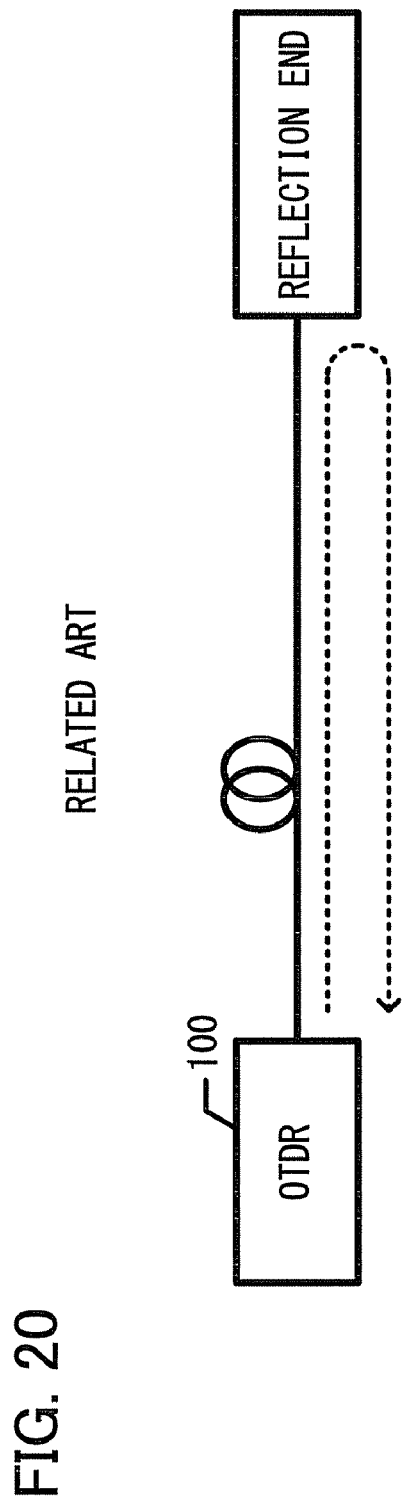
FIG. 20 is a diagram illustrating a measurement system using OTDR.
Figure 21:
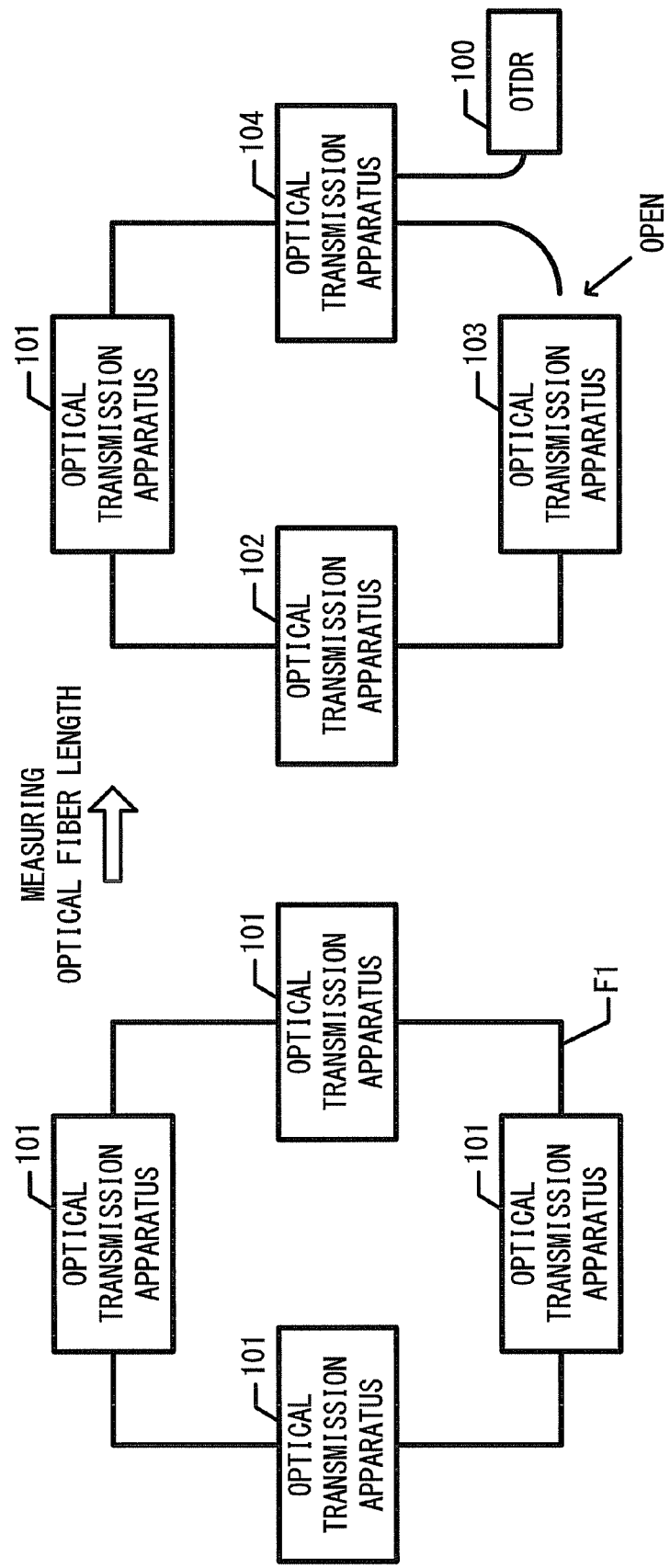
FIG. 21 is a diagram illustrating that a halt of system operation is required.

FIGS. 18 and 19 are a flowchart illustrating the measurement operation of the amount of dispersion.

[S51] The optical switch 10I switches to the transmission state, and the optical switch 30A switches to the reception state.

[S52] The E/O 13A outputs an OSC signal D2 (defined as an OSC signal D2 ($\lambda_1$)) having a wavelength $\lambda 1$ and including the measurement packet P, and the OSC signal D2 ($\lambda_1$) is branched into two signals in the coupler 10H.

[S53] One of the branched OSC signals D2 ($\lambda_1$) is transmitted to the relay station via the OSC coupler 22A-1 and the downward optical fiber FD-2.

[S54] The other of the branched OSC signals D2 ($\lambda_1$) is transmitted to the relay station via the optical switch 10I and the upward optical fiber FU-1.

[S55] The measurement packet (defined as a measurement packet P1 ($\lambda_1$)) having the wavelength $\lambda 1$ and transmitted via the downward optical fiber FD-2, and the measurement packet (defined as a measurement packet P2 ($\lambda_1$)) having the wavelength $\lambda 1$ and transmitted via the upward optical fiber FU-1 arrive at the arrival time difference detection part 30B. Since the process flow until the arrival at the arrival time difference detection part 30B is the same as that in the above described step S35, the description is omitted.

[S56] The arrival time difference detection part 30B detects an arrival time difference $\Delta T\lambda_1$ between the measurement packets P1 ($\lambda_1$) and P2 ($\lambda_1$).

[S57] The E/O 13 outputs an OSC signal D2 (defined as an OSC signal D2 ($\lambda_2$)) having a wavelength $\lambda 2$ and including the measurement packet P, and the OSC signal D2 ($\lambda_2$) is branched into two signals by the coupler 10H.

[S58] One of the branched OSC signals D2 ($\lambda_2$) is transmitted to the relay station via the OSC coupler 22A-1 and the downward optical fiber FD-2.

[S59] The other of the branched OSC signals D2 ($\lambda_2$) is transmitted to the relay station via the optical switch 10I and the upward optical fiber FU-1.

[S60] The measurement packet (defined as a measurement packet P1 ($\lambda_2$)) having the wavelength $\lambda 2$ and transmitted via the downward optical fiber FD-2, and the measurement packet (defined as a measurement packet P2 ($\lambda_2$)) having the wavelength $\lambda 2$ and transmitted via the upward optical fiber FU-1 arrive at the arrival time difference detection part 30B. Since the process flow until the arrival at the arrival time difference detection part 30B is the same as that in the above described step S35, the description is omitted.

[S61] The arrival time difference detection part 30B detects an arrival time difference $\Delta T\lambda_2$ between the measurement packets P1 ($\lambda_2$) and P2 ($\lambda_2$).

[S62] The arrival time difference detection part 30B calculates a difference $\Delta T\lambda$ between the arrival time difference $\Delta T\lambda_1$ and the arrival time difference $\Delta T\lambda_2$.

[S63] The optical switch 30A switches to the transmission state, and the optical switch 10I switches to the reception state.

The relay part 30-2 (control part 35 illustrated in FIG. 13) transmits the calculation result of step S62 to the OADM 20-3 in the terminal station via the upward fiber FU-1 by using the OSC signal generated in the relay station.

[S65] As indicated in formula (7a), the amount of dispersion Dfiber is represented by an average change rate (wavelength differential of delay time) of an amount of wavelength change dλ between different wavelengths and an amount of time change dTλ between the arrival delay times of the different wavelengths.

$$D\text{fiber(ps/nm)} = dT\lambda/d\lambda \tag{7a}$$

Therefore, the measurement control part 1D-1 calculates the amount of dispersion Dfiber in the downward optical fiber FD-2 and the upward optical fiber FU-1 by using the following formula (7b), wherein Δλ is a wavelength difference between the wavelength λ1 and the wavelength λ2:

$$D\text{fiber(ps/nm)} = dT\lambda/\Delta\lambda \tag{7b}$$

A dispersion slope Sfiber is a wavelength differential of the amount of dispersion. Therefore, Sfiber is calculated by the formula (8).

$$S\text{fiber(ps/nm}^2) = D\text{fiber}/\Delta\lambda \tag{8}$$

Although the E/O 13A has the wavelength variable function in the above description, as another configuration example, it is possible to have a configuration which includes a fixed wavelength oscillation E/O oscillating the wavelength λ1 and a fixed wavelength oscillation E/O oscillating the wavelength λ2, and performs a control for alternately switching outputs of both E/Os.

As described above, maintenance efficiency is improved by providing an automatic optical fiber transmission line measurement without using a special optical measurement apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A measurement apparatus for measuring an optical fiber transmission line used to connect to an opposite apparatus, the measurement apparatus comprising:
   a transmission part for generating a measurement packet used for measuring a length of a first and second optical fiber transmission line, and transmitting the measurement packet to the opposite apparatus through the first optical fiber transmission line;
   a reception part for detecting the measurement packet returned from the opposite apparatus that performs a loopback processing of the measurement packet through the second optical fiber transmission line;
   a calculation part for calculating a packet transmission time which is a processing time required from the generation of the measurement packet to the detection of the measurement packet; and
   a measurement part for performing a measurement control of the length of the first and second optical fiber transmission line, based on the packet transmission time calculated by the calculation part.

2. The measurement apparatus according to claim 1, wherein the transmission part comprises:
   a measurement packet generating part for generating the measurement packet;
   an insertion part for inserting the measurement packet in a monitoring control signal so as to generate a packet insertion signal;
   an electric/optical conversion part for converting the packet insertion signal into an optical packet insertion signal so as to generate an optical monitoring control signal; and
   a multiplexer for multiplexing the optical monitoring control signal on an optical main signal so as to generate an optical multiplex signal and transmitting the optical multiplex signal to the opposite apparatus through the first optical fiber transmission line;
wherein the reception part comprises:
   a demultiplexer part for receiving the optical multiplex signal transmitted from the opposite apparatus through the second optical fiber transmission line and demultiplexing the optical monitoring control signal from an optical main signal;
   an optical/electric conversion part for converting the optical monitoring control signal into the electric monitoring control signal so as to reproduce the packet insertion signal; and
   a measurement packet detection part for detecting the measurement packet to which the loopback processing is performed in the opposite apparatus, from the packet insertion signal reproduced by the optical/electric conversion part.

3. The measurement apparatus according to claim 2,
wherein the reception part receives the measurement packet through a dispersion compensating fiber for performing dispersion compensation of the optical multiplex signal transmitted through the second optical fiber transmission line,
wherein the measurement part comprises a storage medium for storing:
   a packet processing time which is a sum of a processing time required from a generation of the measurement packet to a transmission of the measurement packet to the first optical fiber transmission line, and a processing time required from a reception of the measurement packet through the second optical fiber transmission line to a detection of the measurement packet;
   a loopback time required for performing the loopback processing from a reception to a transmission of the measurement packet in the opposite apparatus; and
   information of a length of the dispersion compensating fiber;
when the measurement apparatus has an apparatus configuration on which the measurement packet does not pass through the dispersion compensating fiber, the measurement part measures the length of the sum of the first optical fiber transmission line and the second optical fiber transmission line by use of the packet transmission time calculated by the calculation part, the packet processing time, the loopback time, and a light speed in the optical fiber,
when the measurement apparatus has an apparatus configuration on which the measurement packet passes through the dispersion compensating fiber, the measurement part measures the length of the sum of the first optical fiber transmission line and the second optical fiber transmission line by use of the packet transmission time calculated by the calculation part, the packet processing time, the loopback time, the light speed in the optical fiber, and the information of the length of the dispersion compensating fiber stored in the storage medium.

4. A measurement system for measuring an optical fiber transmission line used to connect a measurement apparatus and an opposite apparatus, the measurement system comprising:

the measurement apparatus comprising:
a transmission part for generating a measurement packet used for measuring a length of a first optical fiber transmission line and transmitting the measurement packet to the opposite apparatus through the first optical fiber transmission line;
a reception part for detecting the measurement packet returned from the opposite apparatus that performs a loopback processing of the measurement packet, through a second optical fiber transmission line;
a calculation part for calculating a packet transmission time which is a processing time required from the generation of the measurement packet to the detection of the measurement packet; and
a measurement part for performing a measurement control of the length of the first and second optical fiber transmission line, based on the packet transmission time calculated by the calculation part; and
the opposite apparatus comprising a loopback part for receiving the measurement packet from the measurement apparatus and transmitting the measurement packet to the measurement apparatus so as to performing the loopback processing.

5. The measurement system according to claim 4, wherein the transmission part comprises:
a measurement packet generating part for generating the measurement packet;
an insertion part for inserting the measurement packet in a monitoring control signal so as to generate a packet insertion signal;
an electric/optical conversion part for converting the packet insertion signal into an optical packet insertion signal so as to generate an optical monitoring control signal; and
a multiplexer for multiplexing the optical monitoring control signal on an optical main signal so as to generate an optical multiplex signal and transmitting the optical multiplex signal to the opposite apparatus through the first optical fiber transmission line;
wherein the reception part comprises:
a demultiplexer part for receiving the optical multiplex signal transmitted from the opposite apparatus through the second optical fiber transmission line and demultiplexing the optical monitoring control signal from the optical main signal;
an optical/electric conversion part for converting the optical monitoring control signal into the electric monitoring control signal so as to reproduce the packet insertion signal; and
a measurement packet detection part for detecting the measurement packet to which the loopback processing is performed in the opposite apparatus, from the packet insertion signal reproduced by the optical/electric conversion part.

6. The measurement system according to claim 5, wherein the reception part receives the measurement packet through a dispersion compensating fiber for performing dispersion compensation of the optical multiplex signal transmitted through the second optical fiber transmission line,
wherein the measurement part comprises a storage medium for storing in advance:
a packet processing time which is a sum of a processing time required from a generation of the measurement packet to a transmission of the measurement packet to the first optical fiber transmission line, and a processing time required from a reception of the measurement packet through the second optical fiber transmission line to a detection of the measurement packet;
a loopback time required for performing the loopback processing from a reception to a transmission of the measurement packet in the opposite apparatus; and
information of a length of the dispersion compensating fiber;
when the measurement apparatus has an apparatus configuration on which the measurement packet does not pass through the dispersion compensating fiber, the measurement part measures the length of the sum of the first optical fiber transmission line and the second optical fiber transmission line by use of the packet transmission time calculated by the calculation part, the packet processing time, the loopback time, and a light speed in the optical fiber,
when the measurement apparatus has an apparatus configuration on which the measurement packet passes through the dispersion compensating fiber, the measurement part measures the length of the sum of the first optical fiber transmission line and the second optical fiber transmission line by use of the packet transmission time calculated by the calculation part, the packet processing time, the loopback time, the light speed in the optical fiber, and the information of the length of the dispersion compensating fiber stored in the storage medium.

7. The measurement system according to claim 6, wherein the measurement apparatus further comprises a coupler for branching the optical monitoring control signal generated in the electric/optical conversion part into two signals, and a first optical switch connected to an end of the second optical fiber transmission line,
wherein the opposite apparatus further comprises a second optical switch connected to an end of the second optical fiber transmission line, and an arrival time difference detection part for detecting a difference between an arrival time of a first measurement packet transmitted through the first optical fiber transmission line and an arrival time of a second measurement packet transmitted through the second optical fiber transmission line,
when the first optical switch makes an optical connection for being able to receive a signal transmitted from the opposite apparatus through the second optical fiber transmission line and the second optical switch makes an optical connection for being able to transmit the signal to the measurement apparatus through the second optical fiber transmission line,
the measurement part measures the length of the sum of the first optical fiber transmission line and the second optical fiber transmission line,
when the first optical switch makes an optical connection for being able to transmit a signal to the opposite apparatus through the second optical fiber transmission line and the second switch optical makes an optical connection for being able to receive the signal transmitted from the measurement apparatus through the second optical fiber transmission line,
the measurement apparatus transmits a first optical monitoring control signal branched by the coupler to the opposite apparatus through the first optical fiber transmission line and transmits a second optical monitoring control signal branched by the coupler to the opposite apparatus through the first optical switch and the second optical fiber transmission line, the arrival time difference detection part detects the difference between the arrival time of the first measurement packet included in the first optical monitoring control signal and the arrival time of the second measurement packet included in the second optical monitoring control signal so as to calculate the length of the first optical fiber transmission line and the length of the second optical fiber transmission line.

8. The measurement system according to claim 7, wherein the measurement part comprises the storage medium for storing in advance an average dispersion quantity in each type of optical fiber used for the first optical fiber transmission line and the second optical fiber transmission line, the measurement part calculates a dispersion quantity of the first optical fiber transmission line and the second optical fiber transmission line.

9. The measurement system according to claim 7, wherein the electric/optical conversion part generates a first wavelength shorter than a shortest wavelength in a wavelength range used in optical communication, and a second wavelength longer than a longest wavelength in a wavelength range used in optical communication, when the first optical switch makes an optical connection for being able to transmit a signal to the opposite apparatus through the second optical fiber transmission line and the second optical switch makes an optical connection for being able to receive the signal transmitted from the measurement apparatus through the second optical fiber transmission line, the measurement apparatus transmits the first optical monitoring control signal with the first wavelength to the opposite apparatus through the first optical fiber transmission line, and transmits the second optical monitoring control signal with the first wavelength to the opposite apparatus through the second optical fiber transmission line, the arrival time difference detection part detects a first difference between the arrival time of the first measurement packet with the first wavelength included in the first optical monitoring control signal and the arrival time of the second measurement packet with the first wavelength included in the second optical monitoring control signal, the measurement apparatus transmits the first optical monitoring control signal with the second wavelength to the opposite apparatus through the first optical fiber transmission line, and transmits the second optical monitoring control signal with the second wavelength to the opposite apparatus through the second optical fiber transmission line, the arrival time difference detection part detects a second difference between the arrival time of the first measurement packet with the second wavelength included in the first optical monitoring control signal and the arrival time of the second measurement packet with the second wavelength included in the second optical monitoring control signal, the arrival time detection part calculates a third difference between the first difference and the second difference, the measurement part calculates the dispersion quantity of the first optical fiber transmission line and the second optical fiber transmission line based on the third difference and a difference between the first wavelength and the second wavelength.

10. A measurement apparatus for measuring an optical fiber transmission line used to connect to an opposite apparatus, the measurement apparatus comprising:

a transmission part for generating a measurement signal used for measuring a length of a first and second optical fiber transmission line, transmitting the measurement signal to the opposite apparatus through the first optical fiber transmission line, and holding a transmission processing time required from a generation of the measurement signal to a transmission of the measurement signal to the first optical fiber transmission line;

a reception part for detecting the measurement signal returned from the opposite apparatus that performs a loopback processing of the measurement signal through the second optical fiber transmission line, detecting a loopback processing time required from a reception of the measurement signal to a transmission of the measurement signal so as to return the measurement signal in the opposite apparatus, and holding the detected loopback processing time and a reception processing time required from a reception of the measurement signal through the second optical fiber transmission line to a detection of the measurement signal; and a control part for calculating the length of sum of the first optical fiber transmission line and the second optical fiber transmission line based on a measurement time required from the generation of the measurement signal to the detection of the measurement signal, the transmission processing time held in the transmission part, the reception processing time held in the reception part, and the loopback processing time held in the reception part.

* * * * *

UNITED STATES PATENT AND TRADEMARK OFFICE
CERTIFICATE OF CORRECTION

PATENT NO. : 8,189,180 B2  
APPLICATION NO. : 12/576334  
DATED : May 29, 2012  
INVENTOR(S) : Koji Bato et al.

Page 1 of 1

It is certified that error appears in the above-identified patent and that said Letters Patent is hereby corrected as shown below:

Column 20, Line 60, In Claim 7, delete "second switch optical" and insert -- second optical switch --, therefor.

Signed and Sealed this
Seventh Day of August, 2012

David J. Kappos
*Director of the United States Patent and Trademark Office*